(12) United States Patent
Zuo et al.

(10) Patent No.: US 12,744,825 B2
(45) Date of Patent: Sep. 22, 2026

(54) COMMUNICATION METHOD, APPARATUS, AND SYSTEM FOR PASSWORD-FREE LOGIN BASED ON USING NETWORK RESOURCES OF TELECOMMUNICATIONS OPERATORS

(71) Applicant: HUAWEI TECHNOLOGIES CO., LTD., Shenzhen (CN)

(72) Inventors: Jun Zuo, Dongguan (CN); Guanhua Zhang, Dongguan (CN); Haitao Wei, Shenzhen (CN); Fei Li, Boulogne Billancourt (FR)

(73) Assignee: Huawei Technologies Co., Ltd., Shenzhen (CN)

( * ) Notice: Subject to any disclaimer, the term of this patent is extended or adjusted under 35 U.S.C. 154(b) by 51 days.

(21) Appl. No.: 18/897,638

(22) Filed: Sep. 26, 2024

(65) Prior Publication Data

US 2025/0016213 A1 Jan. 9, 2025

Related U.S. Application Data

(63) Continuation of application No. PCT/CN2023/082304, filed on Mar. 17, 2023.

(30) Foreign Application Priority Data

Mar. 28, 2022 (CN) ......................... 202210312676.9

(51) Int. Cl.
*H04L 65/1104* (2022.01)

(52) U.S. Cl.
CPC ................................ *H04L 65/1104* (2022.05)

(58) Field of Classification Search
CPC ............... H04W 12/06; H04L 65/1104; H04L 2209/80; H04L 9/3226; H04L 65/1023
See application file for complete search history.

(56) References Cited

U.S. PATENT DOCUMENTS 9,571,282 B1 * 2/2017 Aggarwal ................. H04L 9/32
10,218,695 B1 * 2/2019 Jain ....................... H04L 63/102
(Continued)

FOREIGN PATENT DOCUMENTS

CN 110198530 A 9/2019
WO 2021045573 A1 3/2021

OTHER PUBLICATIONS

Extended European Search Report in European Appln. No. 23777887.3, mailed on May 23, 2025, 7 pages.
(Continued)

*Primary Examiner* — Muhammad Raza
(74) *Attorney, Agent, or Firm* — Fish & Richardson P.C.

(57) ABSTRACT

Embodiments of this application provide example communication methods, apparatuses, and systems. One example method includes sending, by a user equipment, a first uncharged traffic message to a core network device, where the first uncharged traffic message is for triggering the core network device to send a second uncharged traffic message to the user equipment. The user equipment receives the second uncharged traffic message from the core network device, where the second uncharged traffic message includes login information, and the login information allows the user equipment to log in to an application server. The user equipment sends the login information to the application server to log in to the application server. Both the first uncharged traffic message and the second uncharged traffic message are transmitted via a base station without generating to-be-charged traffic.

12 Claims, 9 Drawing Sheets

(56) References Cited

U.S. PATENT DOCUMENTS 12,105,842 B1* 10/2024 Dods ..................... G06N 3/084
2003/0152039 A1* 8/2003 Roberts ................. H04M 15/51 370/255
2004/0125755 A1* 7/2004 Roberts ..................... H04L 9/40 370/259
2005/0169208 A1* 8/2005 Carrion-Rodrigo .. H04W 76/12 370/328
2005/0227667 A1* 10/2005 Jung ..................... H04L 41/00 455/408
2007/0274522 A1* 11/2007 Boman ............ H04M 15/8214 380/247
2010/0312897 A1* 12/2010 Allen ................. H04L 12/1822 709/227
2012/0209990 A1* 8/2012 Honore ............... H04L 12/1496 709/224
2012/0220261 A1* 8/2012 Grefen ................ H04L 12/1485 455/406
2013/0132854 A1* 5/2013 Raleigh ................. G06F 3/0482 715/738
2013/0198374 A1* 8/2013 Zalmanovitch ....... H04M 15/85 709/224
2013/0212653 A1* 8/2013 Hoghaug ................ G06F 21/34 726/5
2014/0068212 A1* 3/2014 Lin ..................... H04M 15/58 711/162
2014/0137206 A1* 5/2014 Hansmann ............ H04W 12/04 726/4
2015/0025976 A1* 1/2015 Guo ..................... H04L 47/72 705/14.64
2015/0215225 A1* 7/2015 Mildh .................. H04L 47/263 370/236
2015/0327042 A1* 11/2015 Kempf ................ H04L 41/5096 455/406
2016/0006883 A1* 1/2016 Cartmell ............... H04M 15/66 455/408
2016/0142553 A1* 5/2016 Gandhi .................. H04W 4/24 455/406
2016/0182736 A1* 6/2016 Tiger ................ H04M 15/8214 455/406
2016/0261751 A1* 9/2016 Tubi ...................... H04W 12/08
2016/0315857 A1* 10/2016 Lubashev ........... H04L 12/6418
2016/0374007 A1* 12/2016 Tian ...................... H04W 48/10
2016/0380824 A1* 12/2016 Vuornos ............... H04W 48/14 370/259
2016/0381603 A1* 12/2016 Vuornos ............... H04M 15/66 455/406
2017/0178193 A1* 6/2017 Jagannath .............. G06Q 30/04
2017/0201850 A1* 7/2017 Raleigh .................. H04W 4/50
2017/0279681 A1* 9/2017 Vuolteenaho ......... H04L 43/106
2017/0359313 A1* 12/2017 Livneh ................ H04L 63/0414
2018/0013848 A1* 1/2018 Schejter .................. H04L 67/02
2018/0048729 A1* 2/2018 Duvdevani ........... H04L 67/563
2018/0062995 A1* 3/2018 Naar ..................... G06F 16/955
2018/0063270 A1* 3/2018 Naar ..................... H04L 43/106
2018/0115625 A1* 4/2018 Livneh ................ G06F 21/6254
2018/0262354 A1* 9/2018 Vuornos ............. H04L 12/1496
2018/0288175 A1* 10/2018 Vuornos ............... H04L 67/535
2018/0352537 A1* 12/2018 Zhang ................... H04W 72/04
2018/0375863 A1* 12/2018 Fan ......................... G06F 21/31
2019/0075581 A1* 3/2019 Salem ............... H04W 72/1268
2019/0122238 A1* 4/2019 La Roche ........... H04L 12/1403
2019/0268883 A1* 8/2019 Zhang ................... H04L 5/0094
2019/0372959 A1* 12/2019 Pattar .................... H04L 63/083
2020/0045519 A1* 2/2020 Raleigh ................... H04W 4/50
2020/0314809 A1* 10/2020 Zhang ................... H04W 72/04
2020/0389916 A1* 12/2020 Salem ................. H04W 74/006
2020/0404655 A1* 12/2020 Salem ................... H04W 16/14
2021/0203581 A1* 7/2021 He ...................... H04L 43/0882
2022/0337995 A1* 10/2022 Baek ..................... H04W 12/06
2023/0050350 A1* 2/2023 Gochi Garcia ......... H04L 47/20
2023/0271019 A1* 8/2023 DeBates ............ A61N 1/37217 607/60
2025/0016213 A1* 1/2025 Zuo ....................... H04W 12/06

OTHER PUBLICATIONS

China Mobile [online], "Internet Capability Exposure Platform-Mobile Application Capability Service Expert, Capability Profile" May 12, 2020, retrieved on Oct. 30, 2024, retrieved from URL <https://dev.10086.cn/docInside?contentId=10000067529678>, 4 pages (with English translation).

E-Surfing account open platform [online], "Passwordless authentication One-click login improves visitor login converrate" Oct. 2024, retrieved on Oct. 30, 2024, retrieved from URL <https://id. 189.cn/banner/unPassword>, 4 pages (with English translation).

WeChat Login Function / Mobile App WeChat Login Development Guide [online], "Mobile App WeChat Login Development Guide" Oct. 2024, retrieved on Oct. 30, 2024, retrieved from URL <https://developers.weixin.qq.com/doc/oplatform/Mobile_App/WeChat_Login/Development_Guide.html>, 19 pages (with English translation).

China Unicom [online], "Online external service portal" Nov. 2024, retrieved on Nov. 1, 2024, retrieved from URL <https://www.onlineinfotech.cn/product/detail?productId=39b6528d-0d1d-44>, 6 pages (with English translation).

International Search Report and Written Opinion in International Appln. No. PCT/CN2023/082304, mailed on May 17, 2023, 15 pages (with English translation).

* cited by examiner

900

Processor 910

Transceiver 930

Memory 920

COMMUNICATION METHOD, APPARATUS, AND SYSTEM FOR PASSWORD-FREE LOGIN BASED ON USING NETWORK RESOURCES OF TELECOMMUNICATIONS OPERATORS

CROSS-REFERENCE TO RELATED APPLICATIONS

This application is a continuation of International Application No. PCT/CN2023/082304, filed on Mar. 17, 2023, which claims priority to Chinese Patent Application No. 202210312676.9, filed on Mar. 28, 2022. The disclosures of the aforementioned applications are hereby incorporated by reference in their entireties.

TECHNICAL FIELD

This application relates to the communication field, and in particular, to a communication method, apparatus, and system.

BACKGROUND

With continuous improvement of interaction experience of users, a login mode, namely, password-free login, emerges. The password-free login allows the users to log in without manually entering accounts and passwords. The password-free login may be applied to many scenarios, for example, service scenarios such as registration with, login to, and payment in an enterprise application (application, APP). The password-free login mode better meets requirements of the users on the interaction experience. This mode can increase a login speed and improve login efficiency, and can also avoid problems caused by forgetting the passwords or entering incorrect passwords by the users. How to implement the password-free login by using network resources of telecommunications operators is a problem worth considering.

SUMMARY

Embodiments of this application provide a communication method, apparatus, and system, to implement password-free login by using network resources of telecommunications operators.

According to a first aspect, a communication method is provided. The method may be performed by a user equipment, or may be performed by a component (for example, a chip or a circuit) of the user equipment. This is not limited.

The method may include: The user equipment sends a first uncharged traffic message to a core network device, where the first uncharged traffic message is for triggering the core network device to send a second uncharged traffic message to the user equipment. The user equipment receives the second uncharged traffic message from the core network device, where the second uncharged traffic message includes login information, and the login information is information needed by the user equipment to log in to an application server. The user equipment sends the login information to the application server, to log in to the application server. Both the first uncharged traffic message and the second uncharged traffic message are messages that are transmitted via a base station without generating to-be-charged traffic.

The to-be-charged traffic is data traffic that is detected by a data gateway (for example, a user plane function (user plane function, UPF) network element) in a telecommunications network and that should be charged.

In an example, the first uncharged traffic message may include indication information, and the indication information indicates the core network device to provide the login information to the user equipment. Alternatively, the first uncharged traffic message may implicitly indicate (or the first uncharged traffic message has a function of triggering) the core network device to provide the login information to the user equipment, in other words, after receiving the first uncharged traffic message, the core network device may learn that the login information is to be provided to the user equipment.

According to the foregoing technical solution, the user equipment sends the first uncharged traffic message to the core network device, where the first uncharged traffic message may be for triggering the core network device to send the second uncharged traffic message to the user equipment, and the second uncharged traffic message carries the login information. After receiving the login information, the user equipment may log in to the application server based on the login information. Both the first uncharged traffic message and the second uncharged traffic message are the messages that are transmitted via the base station without generating the to-be-charged traffic. In this way, obtaining, by using the messages that generate no to-be-charged traffic, the information needed for logging in to the application server can implement password-free login by using a network resource of a telecommunications operator, and can also be applied to more scenarios. For example, convenient and secure password-free login can also be performed when mobile network data traffic of the user equipment of a user is switched off.

With reference to the first aspect, in some implementations of the first aspect, the first uncharged traffic message indicates the core network device to provide the login information to the user equipment.

In an example, the first uncharged traffic message may indicate the core network device to provide the login information to the user equipment. Based on this example, after receiving the first uncharged traffic message, the core network device may determine to provide the login information to the user equipment.

In another example, the first uncharged traffic message includes the indication information, and the indication information indicates the core network device to provide the login information to the user equipment. Based on this example, after receiving the first uncharged traffic message, the core network device may determine, based on the indication information in the first uncharged traffic message, to provide the login information to the user equipment.

With reference to the first aspect, in some implementations of the first aspect, the method further includes: The user equipment obtains and displays first identification information, or the user equipment obtains and displays second identification information, where the first identification information identifies a user corresponding to the user equipment, and the second identification information is a result obtained by performing anonymization processing on the first identification information.

For example, the first identification information is a communication identifier of the user corresponding to the user equipment, for example, is a mobile phone number of the user.

According to the foregoing technical solution, the user equipment obtains the first identification information or the second identification information, so that the identification information of the user can be displayed on a login page, and the user can learn that the user equipment is to perform password-free login by using the identifier of the user, and can further determine whether to use an identifier corresponding to the first identification information or the second identification information for login. In this way, login experience of the user can be improved. In addition, if the second identification information is displayed on the login page, leakage of a user identifier of the user to a third-party entity can be further avoided.

With reference to the first aspect, in some implementations of the first aspect, that the user equipment obtains first identification information includes: The user equipment obtains the first identification information from a message sent by the core network device. Alternatively, that the user equipment obtains second identification information includes either of the following: The user equipment obtains the second identification information from a message sent by the core network device; or the user equipment obtains the first identification information from a message sent by the core network device, and performs anonymization processing on the first identification information to obtain the second identification information.

According to the foregoing technical solution, the user equipment may directly obtain the second identification information; or may obtain the first identification information, and perform anonymization processing on the first identification information to obtain the second identification information.

With reference to the first aspect, in some implementations of the first aspect, that the user equipment obtains the first identification information from a message sent by the core network device includes: The user equipment obtains the first identification information from the second uncharged traffic message. Alternatively, that the user equipment obtains the second identification information from a message sent by the core network device includes: The user equipment obtains the second identification information from the second uncharged traffic message.

According to the foregoing technical solution, the login information and the identification information of the user (for example, the first identification information of the user or the second identification information of the user) may be transmitted by using one piece of signaling, to reduce signaling overheads.

With reference to the first aspect, in some implementations of the first aspect, the method further includes: The user equipment receives a third uncharged traffic message from the core network device, where the third uncharged traffic message is a message that is transmitted via the base station without generating to-be-charged traffic. That the user equipment obtains the first identification information from a message sent by the core network device includes: The user equipment obtains the first identification information from the third uncharged traffic message. Alternatively, that the user equipment obtains the second identification information from a message sent by the core network device includes: The user equipment obtains the second identification information from the third uncharged traffic message.

For example, the third uncharged traffic message may be a SIP query response message or a SIP registration response message.

For example, the third uncharged traffic message may be a NAS registration accept message.

For example, the third uncharged traffic message and the second uncharged traffic message may be the same, or may be different. This is not limited.

With reference to the first aspect, in some implementations of the first aspect, the message that is transmitted via the base station without generating the to-be-charged traffic is a user plane (user plane) message that is transmitted via the base station and a user plane data gateway without generating the to-be-charged traffic.

For example, the user plane data gateway may be a user plane function (user plane function, UPF) network element defined in a 3rd generation partnership project (3rd generation partnership project, 3GPP) standard specification.

For example, the first uncharged traffic message, the second uncharged traffic message, and the third uncharged traffic message are all user plane messages that are transmitted via the base station and the user plane data gateway without generating the to-be-charged traffic.

For example, the user plane message that is transmitted via the base station and the user plane data gateway without generating the to-be-charged traffic may also be described as user plane signaling that is transmitted via the base station and the user plane data gateway without generating the to-be-charged traffic.

With reference to the first aspect, in some implementations of the first aspect, the user plane message that is transmitted via the base station and the user plane data gateway without generating the to-be-charged traffic is a session initiation protocol SIP message.

According to the foregoing technical solution, transmission of SIP signaling may generate no to-be-charged traffic. For example, the SIP signaling is a user plane message of a core network, and the SIP signaling may be initiated by bottom-layer software below an operating system of the UE and access a network through an IMS access point (access point, AP). When the SIP signaling passes through the UPF, after identifying a type of the SIP signaling, the UPF may collect statistics on traffic but does not charge the traffic, in other words, no to-be-charged traffic is generated. Therefore, obtaining, through exchange of the SIP signaling between the user equipment and the core network device, the login information needed for logging in to the application server can implement the password-free login, and can also be applied to more scenarios. For example, the convenient and secure password-free login can also be performed when the mobile network data traffic of the user equipment of the user is switched off.

With reference to the first aspect, in some implementations of the first aspect, the first uncharged traffic message is a SIP query message, and the second uncharged traffic message is a SIP query response message. Alternatively, the first uncharged traffic message is a SIP registration message, and the second uncharged traffic message is a SIP registration response message.

For example, the SIP query message may be, for example, a SIP OPTIONS message.

According to the foregoing technical solution, if the first uncharged traffic message is the SIP registration message, and the second uncharged traffic message is the SIP registration response message, an existing procedure may be reused. For example, the login information is obtained when the user equipment registers with a communication network according to a SIP protocol, to reduce signaling overheads.

With reference to the first aspect, in some implementations of the first aspect, the core network device is a call session control function device.

For example, the call session control function device may be a serving-call session control function (serving-call session control function, S-CSCF) device.

For example, the core network device (for example, the call session control function device) may verify an identity of the application server. For example, the application server may negotiate a key with the core network device (for example, the call session control function device) in advance. The key may be used by the core network device to verify the identity of the application server when the application server requests the core network device to verify the login information. After completing the verification of the identity of the application server, the core network device may start to verify the login information.

For example, the core network device may further include another functional network element. This is not limited.

With reference to the first aspect, in some implementations of the first aspect, the message that is transmitted via the base station without generating the to-be-charged traffic is a control plane (control plane) message transmitted via the base station but not via a user plane data gateway.

For example, all the first uncharged traffic message, the second uncharged traffic message, and the third uncharged traffic message are control plane messages that are transmitted via the base station but not via the user plane data gateway.

For example, the control plane message transmitted via the base station but not via the user plane data gateway may also be described as control plane signaling transmitted via the base station but not via the user plane data gateway.

With reference to the first aspect, in some implementations of the first aspect, the control plane message transmitted via the base station but not via the user plane data gateway is a non-access stratum NAS message.

According to the foregoing technical solution, because NAS signaling is a control plane message, and the control plane message may not be counted toward traffic, the to-be-charged traffic is not generated. In this way, obtaining, through exchange of the NAS signaling between the user equipment and the core network device, the login information needed for logging in to the application server can implement the password-free login, and can also be applied to more scenarios. For example, the convenient and secure password-free login can also be performed when the user equipment does not support an IMS network.

With reference to the first aspect, in some implementations of the first aspect, the first uncharged traffic message is a NAS registration message, and the second uncharged traffic message is a NAS registration accept message.

With reference to the first aspect, in some implementations of the first aspect, the core network device is an access management network element.

For example, the access management network element may be an access and mobility management function (access and mobility management function, AMF) network element defined in a 3GPP standard specification.

For example, the core network device (for example, the AMF network element) may verify an identity of the application server. For example, the application server may negotiate a key with the core network device (for example, the AMF network element) in advance. The key may be used by the core network device to verify the identity of the application server when the application server requests the core network device to verify the login information. After completing the verification of the identity of the application server, the core network device may start to verify the login information.

For example, the core network device may further include another functional network element. This is not limited.

With reference to the first aspect, in some implementations of the first aspect, the second uncharged traffic message further includes an authentication address of the login information.

The authentication address of the login information may indicate that the login information may be authenticated by sending the login information to the authentication address. For example, the authentication address of the login information is an address of a network exposure network element, and the application server sends the login information to the network exposure network element, so that the login information can be verified. For example, the network exposure network element may send the login information to the core network device, so that the core network device verifies the login information. For another example, the authentication address of the login information is an address of the core network device, and the application server sends the login information to the core network device, so that the core network device verifies the login information.

According to the foregoing technical solution, the second uncharged traffic message further includes the authentication address of the login information. The authentication address may indicate an address of a device that is to perform authentication on the login information, an address of a device that is to provide an interface service for authentication on the login information, or an address of a device that is to receive the login information from the application server. In a possible form, the authentication address of the login information is the address of the network exposure network element. In another possible form, the authentication address of the login information is other address information, and the address of the network exposure network element may be determined based on the other address information.

According to a second aspect, a communication method is provided. The method may be performed by a core network device, or may be performed by a component (for example, a chip or a circuit) of the core network device. This is not limited. For ease of description, the following provides descriptions by using an example in which the method is performed by the core network device.

The method may include: The core network device receives a first uncharged traffic message from a user equipment, where the first uncharged traffic message is for triggering the core network device to send a second uncharged traffic message to the user equipment. The core network device generates login information, where the login information is information needed by the user equipment to log in to an application server. The core network device sends the second uncharged traffic message to the user equipment, where the second uncharged traffic message includes the login information. Both the first uncharged traffic message and the second uncharged traffic message are messages that are transmitted via a base station without generating to-be-charged traffic.

With reference to the second aspect, in some implementations of the second aspect, the first uncharged traffic message indicates the core network device to provide the login information to the user equipment.

With reference to the second aspect, in some implementations of the second aspect, the method further includes: The core network device sends first identification information or second identification information to the user equipment, where the first identification information identifies a user corresponding to the user equipment, and the second identification information is a result obtained by performing anonymization processing on the first identification information.

With reference to the second aspect, in some implementations of the second aspect, that the core network device sends second identification information to the user equipment includes: The core network device performs anonymization processing on the first identification information to obtain the second identification information, and sends the second identification information to the user equipment.

With reference to the second aspect, in some implementations of the second aspect, the second uncharged traffic message includes the first identification information or the second identification information.

With reference to the second aspect, in some implementations of the second aspect, that the core network device sends first identification information or second identification information to the user equipment includes: The core network device sends a third uncharged traffic message to the user equipment, where the third uncharged traffic message includes the first identification information or the second identification information. The third uncharged traffic message is a message that is transmitted via the base station without generating to-be-charged traffic.

With reference to the second aspect, in some implementations of the second aspect, the message that is transmitted via the base station without generating the to-be-charged traffic is a user plane message that is transmitted via the base station and a user plane data gateway without generating the to-be-charged traffic.

With reference to the second aspect, in some implementations of the second aspect, the user plane message that is transmitted via the base station and the user plane data gateway without generating the to-be-charged traffic is a session initiation protocol SIP message.

With reference to the second aspect, in some implementations of the second aspect, the first uncharged traffic message is a SIP query message, and the second uncharged traffic message is a SIP query response message. Alternatively, the first uncharged traffic message is a SIP registration message, and the second uncharged traffic message is a SIP registration response message.

With reference to the second aspect, in some implementations of the second aspect, the core network device is a call session control function device.

With reference to the second aspect, in some implementations of the second aspect, the message that is transmitted via the base station without generating the to-be-charged traffic is a control plane message transmitted via the base station but not via a user plane data gateway.

With reference to the second aspect, in some implementations of the second aspect, the control plane message transmitted via the base station but not via the user plane data gateway is a non-access stratum NAS message.

With reference to the second aspect, in some implementations of the second aspect, the first uncharged traffic message is a NAS registration message, and the second uncharged traffic message is a NAS registration accept message.

With reference to the second aspect, in some implementations of the second aspect, the core network device is an access management network element.

With reference to the second aspect, in some implementations of the second aspect, the second uncharged traffic message further includes an authentication address of the login information.

With reference to the second aspect, in some implementations of the second aspect, the method further includes: The core network device receives a login authentication message from the application server, where the login authentication message includes the login information. The core network device sends third identification information of the user to the application server, where the third identification information of the user is determined based on the login information.

For example, a third identifier may identify the user. For example, the third identifier is a communication number of the user.

With reference to the second aspect, in some implementations of the second aspect, that the core network device sends third identification information of the user to the application server includes: If the core network device authenticates the login information, the core network device sends the third identification information of the user to the application server.

With reference to the second aspect, in some implementations of the second aspect, the method further includes: The core network device determines the third identification information of the user based on the login information and a correspondence, where the correspondence includes a correspondence between the third identification information of the user and the login information.

For beneficial effects of the second aspect and the possible designs, refer to the related descriptions of the first aspect. Details are not described herein again.

According to a third aspect, a communication method is provided. The method may be performed by a communication system, or may be performed by a component (for example, a chip or a circuit) of the communication system. This is not limited. The following provides descriptions by using an example in which the communication system includes a user equipment and a core network device.

The method may include: The user equipment sends a first uncharged traffic message to the core network device, where the first uncharged traffic message is for triggering the core network device to send a second uncharged traffic message to the user equipment. The core network device receives the first uncharged traffic message, and generates login information, where the login information is information needed by the user equipment to log in to an application server. The core network device sends the second uncharged traffic message to the user equipment, where the second uncharged traffic message includes the login information. The user equipment receives the second uncharged traffic message, and sends the login information to the application server, to log in to the application server. Both the first uncharged traffic message and the second uncharged traffic message are messages that are transmitted via a base station without generating to-be-charged traffic.

For possible implementations and effects of the third aspect, refer to the descriptions in the first aspect and the second aspect. Details are not described herein again.

According to a fourth aspect, a communication method is provided. The method may be performed by a user equipment, or may be performed by a component (for example, a chip or a circuit) of the user equipment. This is not limited.

The method may include: The user equipment sends a session initiation protocol SIP message to a call session control function device. The user equipment receives a response to the SIP message from the call session control function device, where the response to the SIP message includes login information, and the login information is information needed by the user equipment to log in to an application server. The user equipment sends a login request message to the application server, where the login request message includes the login information.

For example, the call session control function device may be an S-CSCF device.

According to the foregoing technical solution, because transmission of SIP signaling may not generate charged traffic of a user, obtaining, through exchange of the SIP signaling between the user and the call session control function device, the login information needed for logging in to the application server can implement password-free login, and can also be applied to more scenarios. For example, convenient and secure password-free login can also be performed when mobile network data traffic of the user equipment of the user is switched off.

With reference to the fourth aspect, in some implementations of the fourth aspect, the SIP message is a SIP query message, and the response to the SIP message is a SIP query response message. Alternatively, the SIP message is a SIP registration message, and the response to the SIP message is a SIP registration response message.

With reference to the fourth aspect, in some implementations of the fourth aspect, the method further includes: The user equipment obtains and displays first identification information, or the user equipment obtains and displays second identification information, where the first identification information identifies a user corresponding to the user equipment, and the second identification information is a result obtained by performing anonymization processing on the first identification information.

With reference to the fourth aspect, in some implementations of the fourth aspect, that the user equipment obtains first identification information includes: The user equipment obtains the first identification information from a message sent by the call session control function device. Alternatively, that the user equipment obtains second identification information includes either of the following: The user equipment obtains the second identification information from a message sent by the call session control function device; or the user equipment obtains the first identification information from a message sent by the call session control function device, and performs anonymization processing on the first identification information to obtain the second identification information.

With reference to the fourth aspect, in some implementations of the fourth aspect, that the user equipment obtains the first identification information from a message sent by the call session control function device includes: The user equipment obtains the first identification information from the response to the SIP message. Alternatively, that the user equipment obtains the second identification information from a message sent by the call session control function device includes: The user equipment obtains the second identification information from the response to the SIP message.

With reference to the fourth aspect, in some implementations of the fourth aspect, the method further includes: The user equipment receives a third uncharged traffic message from the call session control function device, where the third uncharged traffic message is a message that is transmitted via a base station without generating to-be-charged traffic. That the user equipment obtains the first identification information from a message sent by the call session control function device includes: The user equipment obtains the first identification information from the third uncharged traffic message. Alternatively, that the user equipment obtains the second identification information from a message sent by the call session control function device includes: The user equipment obtains the second identification information from the third uncharged traffic message.

With reference to the fourth aspect, in some implementations of the fourth aspect, the response to the SIP message further includes an authentication address of the login information.

For beneficial effects of the fourth aspect and the possible designs, refer to the related descriptions of the first aspect. Details are not described herein again.

According to a fifth aspect, a communication method is provided. The method may be performed by a call session control function device, or may be performed by a component (for example, a chip or a circuit) of the call session control function device. This is not limited. For ease of description, the following provides descriptions by using an example in which the method is performed by the call session control function device.

The method may include: The call session control function device receives a session initiation protocol SIP message from a user equipment. The call session control function device generates login information. The call session control function device sends a response to the SIP message to the user equipment, where the response to the SIP message includes the login information, and the login information is information needed by the user equipment to log in to an application server.

With reference to the fifth aspect, in some implementations of the fifth aspect, the SIP message is a SIP query message, and the response to the SIP message is a SIP query response message. Alternatively, the SIP message is a SIP registration message, and the response to the SIP message is a SIP registration response message.

With reference to the fifth aspect, in some implementations of the fifth aspect, the method further includes: The call session control function device sends first identification information or second identification information to the user equipment, where the first identification information identifies a user corresponding to the user equipment, and the second identification information is a result obtained by performing anonymization processing on the first identification information.

With reference to the fifth aspect, in some implementations of the fifth aspect, that the call session control function device sends second identification information to the user equipment includes: The call session control function device performs anonymization processing on the first identification information to obtain the second identification information, and sends the second identification information to the user equipment.

With reference to the fifth aspect, in some implementations of the fifth aspect, the response to the SIP message includes the first identification information or the second identification information.

With reference to the fifth aspect, in some implementations of the fifth aspect, that the call session control function device sends first identification information or second identification information to the user equipment includes: The call session control function device sends a third uncharged traffic message to the user equipment, where the third uncharged traffic message includes the first identification information or the second identification information. The third uncharged traffic message is a message that is transmitted via a base station without generating to-be-charged traffic.

With reference to the fifth aspect, in some implementations of the fifth aspect, the response to the SIP message further includes an authentication address of the login information.

With reference to the fifth aspect, in some implementations of the fifth aspect, the method further includes: The call session control function device receives a login authentication message from the application server, where the login authentication message includes the login information. The call session control function device sends third identification information of the user to the application server, where the third identification information of the user is determined based on the login information.

With reference to the fifth aspect, in some implementations of the fifth aspect, that the call session control function device sends third identification information of the user to the application server includes: If the call session control function device authenticates the login information, the call session control function device sends the third identification information of the user to the application server.

With reference to the fifth aspect, in some implementations of the fifth aspect, the method further includes: The call session control function device determines the third identification information of the user based on the login information and a correspondence, where the correspondence includes a correspondence between the third identification information of the user and the login information.

For beneficial effects of the fifth aspect and the possible designs, refer to the related descriptions of the fourth aspect. Details are not described herein again.

According to a sixth aspect, a communication method is provided. The method may be performed by a user equipment, or may be performed by a component (for example, a chip or a circuit) of the user equipment. This is not limited.

The method may include: The user equipment sends a non-access stratum NAS message to a core network device. The user equipment receives a response to the NAS message from the core network device, where the response to the NAS message includes login information. The user equipment sends a login request message to an application server, where the login request message includes the login information.

According to the foregoing technical solution, because transmission of NAS signaling may not generate charged traffic of a user, obtaining, through exchange of the NAS signaling between the user and the core network device, the login information needed for logging in to the application server can implement password-free login, and can also be applied to more scenarios. For example, convenient and secure password-free login can also be performed when the user equipment does not support an IMS network.

With reference to the sixth aspect, in some implementations of the sixth aspect, the NAS message is a NAS registration message, and the response to the NAS message is a NAS registration accept message.

With reference to the sixth aspect, in some implementations of the sixth aspect, the method further includes: The user equipment obtains and displays first identification information, or the user equipment obtains and displays second identification information, where the first identification information identifies a user corresponding to the user equipment, and the second identification information is a result obtained by performing anonymization processing on the first identification information.

With reference to the sixth aspect, in some implementations of the sixth aspect, that the user equipment obtains first identification information includes: The user equipment obtains the first identification information from a message sent by the access management network element. Alternatively, that the user equipment obtains second identification information includes either of the following: The user equipment obtains the second identification information from a message sent by the access management network element; or the user equipment obtains the first identification information from a message sent by the access management network element, and performs anonymization processing on the first identification information to obtain the second identification information.

With reference to the sixth aspect, in some implementations of the sixth aspect, that the user equipment obtains the first identification information from a message sent by the access management network element includes: The user equipment obtains the first identification information from the response to the NAS message. Alternatively, that the user equipment obtains the second identification information from a message sent by the access management network element includes: The user equipment obtains the second identification information from the response to the NAS message.

With reference to the sixth aspect, in some implementations of the sixth aspect, the method further includes: The user equipment receives a third uncharged traffic message from the access management network element, where the third uncharged traffic message is a message that is transmitted via a base station without generating to-be-charged traffic. That the user equipment obtains the first identification information from a message sent by the access management network element includes: The user equipment obtains the first identification information from the third uncharged traffic message. Alternatively, that the user equipment obtains the second identification information from a message sent by the access management network element includes: The user equipment obtains the second identification information from the third uncharged traffic message.

With reference to the sixth aspect, in some implementations of the sixth aspect, the response to the NAS message further includes an authentication address of the login information.

For beneficial effects of the sixth aspect and the possible designs, refer to the related descriptions of the first aspect. Details are not described herein again.

According to a seventh aspect, a communication method is provided. The method may be performed by an access management network element, or may be performed by a component (for example, a chip or a circuit) of the access management network element. This is not limited. For ease of description, the following provides descriptions by using an example in which the method is performed by the access management network element.

The method may include: The access management network element receives a NAS message from a user equipment. The access management network element generates login information. The access management network element sends a response to the NAS message to the user equipment, where the response to the NAS message includes login information, and the login information is information needed by the user equipment to log in to an application server.

With reference to the seventh aspect, in some implementations of the seventh aspect, the NAS message is a NAS registration message, and the response to the NAS message is a NAS registration accept message.

With reference to the seventh aspect, in some implementations of the seventh aspect, the method further includes:

The access management network element sends first identification information or second identification information to the user equipment, where the first identification information identifies a user corresponding to the user equipment, and the second identification information is a result obtained by performing anonymization processing on the first identification information.

With reference to the seventh aspect, in some implementations of the seventh aspect, that the access management network element sends second identification information to the user equipment includes: The access management network element performs anonymization processing on the first identification information to obtain the second identification information, and sends the second identification information to the user equipment.

With reference to the seventh aspect, in some implementations of the seventh aspect, the response to the NAS message includes the first identification information or the second identification information.

With reference to the seventh aspect, in some implementations of the seventh aspect, that the access management network element sends first identification information or second identification information to the user equipment includes: The access management network element sends a third uncharged traffic message to the user equipment, where the third uncharged traffic message includes the first identification information or the second identification information. The third uncharged traffic message is a message that is transmitted via a base station without generating to-be-charged traffic.

With reference to the seventh aspect, in some implementations of the seventh aspect, the response to the NAS message further includes an authentication address of the login information.

With reference to the seventh aspect, in some implementations of the seventh aspect, the method further includes: The access management network element receives a login authentication message from the application server, where the login authentication message includes the login information. The access management network element sends third identification information of the user to the application server, where the third identification information of the user is determined based on the login information.

With reference to the seventh aspect, in some implementations of the seventh aspect, that the access management network element sends third identification information of the user to the application server includes: If the access management network element authenticates the login information, the access management network element sends the third identification information of the user to the application server.

With reference to the seventh aspect, in some implementations of the seventh aspect, the method further includes: The access management network element determines the third identification information of the user based on the login information and a correspondence, where the correspondence includes a correspondence between the third identification information of the user and the login information.

For beneficial effects of the seventh aspect and the possible designs, refer to the related descriptions of the sixth aspect. Details are not described herein again.

According to an eighth aspect, a communication method is provided. The method may be performed by an application server, or may be performed by a component (for example, a chip or a circuit) of the application server. This is not limited. For ease of description, the following provides descriptions by using an example in which the method is performed by the application server.

The method may include: The application server receives a login request message of a user equipment, where the login request message includes login information. The application server sends a login authentication message to a core network device, where the login authentication message includes the login information, and the login authentication message requests third identification information of a user. The application server receives the third identification information of the user from the core network device.

With reference to the eighth aspect, in some implementations of the eighth aspect, the login request message further includes an authentication address of the login information. That the application server sends a login authentication message to a core network device includes: The application server sends the login authentication message to the core network device by using the authentication address.

With reference to the eighth aspect, in some implementations of the eighth aspect, the authentication address indicates an address of a network exposure network element. That the application server sends the login authentication message to the core network device by using the authentication address of the login information includes: The application server sends the login authentication message to the core network device through the network exposure network element.

With reference to the eighth aspect, in some implementations of the eighth aspect, the login authentication message further includes an identifier of the application server.

According to a ninth aspect, a communication method is provided. The method may be performed by a core network device, or may be performed by a component (for example, a chip or a circuit) of the core network device. This is not limited. For ease of description, the following provides descriptions by using an example in which the method is performed by the core network device.

The method may include: The core network device receives a login authentication message from an application server, where the login authentication message includes login information. The core network device sends third identification information of a user to the application server, where the third identification information of the user is determined based on the login information.

With reference to the ninth aspect, in some implementations of the ninth aspect, that the core network device sends third identification information of a user to the application server includes: If the core network device authenticates the login information, the core network device sends the third identification information of the user to the application server.

With reference to the ninth aspect, in some implementations of the ninth aspect, the method further includes: The core network device determines the third identification information of the user based on the login information and a correspondence, where the correspondence includes a correspondence between the third identification information of the user and the login information.

With reference to the ninth aspect, in some implementations of the ninth aspect, the core network device is a call session control function device.

According to a tenth aspect, a communication method is provided. The method may be performed by a network exposure network element, or may be performed by a component (for example, a chip or a circuit) of the network exposure network element. This is not limited. For ease of description, the following provides descriptions by using an example in which the method is performed by the network exposure network element.

The method may include: The network exposure network element receives a login authentication message from an application server, where the login authentication message includes login information. The network exposure network element sends the login authentication message to a core network device. The network exposure network element receives third identification information of a user from the core network device, where the third identification information of the user is determined based on the login information. The network exposure network element sends the third identification information of the user to the application server.

With reference to the tenth aspect, in some implementations of the tenth aspect, the core network device is a call session control function device.

With reference to the first aspect to the tenth aspect, in some implementations, the login information includes a result of encrypting or signing, by the core network device, at least one of the following information: information about user equipment, information about the user corresponding to the user equipment, the authentication address of the login information, an application scope of the login information, or a validity period of the login information.

With reference to the first aspect to the tenth aspect, in some implementations, the login information is a character string generated based on at least one of the following: a digit, a letter, or a symbol.

According to an eleventh aspect, a communication apparatus is provided. The apparatus is configured to perform the method in any one of the possible implementations of the first aspect to the tenth aspect. Specifically, the apparatus may include a unit and/or a module, for example, a processing unit and/or a communication unit, configured to perform the method in any one of the possible implementations of the first aspect to the tenth aspect.

In an implementation, the apparatus is a communication device (for example, a user equipment or a core network device). When the apparatus is the communication device, the communication unit may be a transceiver or an input/output interface, and the processing unit may be at least one processor. Optionally, the transceiver may be a transceiver circuit. Optionally, the input/output interface may be an input/output circuit.

In another implementation, the apparatus is a chip, a chip system, or a circuit used in a communication device (for example, a user equipment or a core network device). When the apparatus is the chip, the chip system, or the circuit used in the communication device, the communication unit may be an input/output interface, an interface circuit, an output circuit, an input circuit, a pin, a related circuit, or the like of the chip, the chip system, or the circuit, and the processing unit may be at least one processor, a processing circuit, a logic circuit, or the like.

According to a twelfth aspect, a communication apparatus is provided. The apparatus includes at least one processor, configured to execute a computer program or instructions stored in a memory, to perform the method in any one of the possible implementations of the first aspect to the tenth aspect. Optionally, the apparatus further includes the memory, configured to store the computer program or the instructions. Optionally, the apparatus further includes a communication interface, and the processor reads, through the communication interface, the computer program or the instructions stored in the memory.

In an implementation, the apparatus is a communication device (for example, a user equipment or a core network device).

In another implementation, the apparatus is a chip, a chip system, or a circuit used in a communication device (for example, a user equipment or a core network device).

According to a thirteenth aspect, a processor is provided, configured to perform the methods provided in the foregoing aspects.

Operations such as sending and obtaining/receiving related to the processor may be understood as operations such as outputting and receiving or inputting of the processor or sending and receiving operations performed by a radio frequency circuit and an antenna, unless otherwise specified, or provided that the operations do not contradict actual functions or internal logic of the operations in related descriptions. This is not limited in this application.

According to a fourteenth aspect, a computer-readable storage medium is provided. The computer-readable medium stores program code executed by a user equipment, and the program code is for performing the method in any one of the possible implementations of the first aspect to the tenth aspect.

According to a fifteenth aspect, a computer program product including instructions is provided. When the computer program product runs on a computer, the computer is enabled to perform the method in any one of the possible implementations of the first aspect to the tenth aspect.

According to a sixteenth aspect, a communication system is provided, including the foregoing user equipment and/or the foregoing core network device.

DESCRIPTION OF EMBODIMENTS

Figure 1:
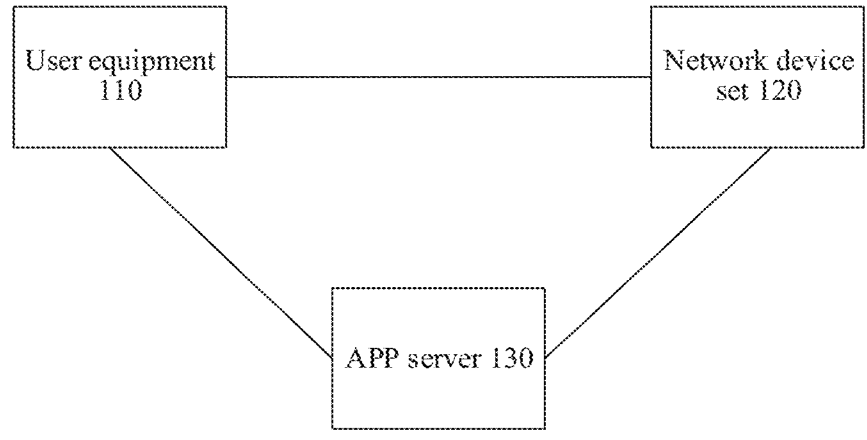
FIG. 1 is a diagram of a communication system applicable to an embodiment of this application.

The following describes technical solutions in embodiments of this application with reference to the accompanying drawings.

The technical solutions in embodiments of this application may be applied to various communication systems, for example, a 5th generation (5th generation, 5G) or new radio (new radio, NR) system, a long term evolution (long term evolution, LTE) system, an LTE frequency division duplex (frequency division duplex, FDD) system, and an LTE time division duplex (time division duplex, TDD) system. The technical solutions provided in this application may be further applied to a future communication system, for example, a 6th generation mobile communication system. The technical solutions provided in this application may be further applied to device-to-device (device-to-device, D2D) communication, vehicle-to-everything (vehicle-to-everything, V2X) communication, machine-to-machine (machine-to-machine, M2M) communication, machine type communication (machine type communication, MTC), an Internet of things (Internet of things, IoT) communication system, or another communication system.

In embodiments of this application, a user equipment (user equipment, UE) may also be referred to as a terminal device, an access terminal, a subscriber unit, a subscriber station, a mobile station, a remote station, a remote terminal, a mobile device, a user terminal, a terminal, a wireless communication device, a user agent, or a user apparatus.

The user equipment may be a device that provides a user with a voice/data, for example, a handheld device or a vehicle-mounted device having a wireless connection function. Currently, some examples of the terminal are: a mobile phone (mobile phone), a tablet computer, a notebook computer, a palmtop computer, a mobile Internet device (mobile Internet device, MID), a wearable device, a virtual reality (virtual reality, VR) device, an augmented reality (augmented reality, AR) device, a wireless terminal in industrial control (industrial control), a wireless terminal in self-driving (self-driving), a wireless terminal in remote medical surgery (remote medical surgery), a wireless terminal in a smart grid (smart grid), a wireless terminal in transportation safety (transportation safety), a wireless terminal in a smart city (smart city), a wireless terminal in a smart home (smart home), a cellular phone, a cordless phone, a session initiation protocol (session initiation protocol, SIP) phone, a wireless local loop (wireless local loop, WLL) station, a personal digital assistant (personal digital assistant, PDA), a handheld device or a computing device having a wireless communication function, another processing device or wearable device connected to a wireless modem, a terminal device in a 5G network, or a terminal device in a future evolved public land mobile network (public land mobile network, PLMN). This is not limited in embodiments of this application.

By way of example and not limitation, in embodiments of this application, the user equipment may alternatively be a wearable device. The wearable device may also be referred to as a wearable intelligent device, and is a general term of a wearable device that is intelligently designed and developed for daily wear by using a wearable technology, for example, glasses, gloves, a watch, clothing, and shoes. The wearable device is a portable device that is directly worn on the body or integrated into clothing or an accessory of a user. The wearable device is not only a hardware device, but also implements a powerful function through software support, data exchange, and cloud interaction. In a broad sense, intelligent wearable devices include full-featured and large-size devices that can implement complete or partial functions without depending on smartphones, for example, smart watches or smart glasses, and devices that are dedicated to only one type of application function and need to be used together with other devices such as smartphones, such as various smart bands or smart jewelry for monitoring physical signs.

In embodiments of this application, an apparatus configured to implement functions of the user equipment may be a user equipment, or may be an apparatus, for example, a chip system or a chip, that can support the user equipment in implementing the functions. The apparatus may be installed in the user equipment. In embodiments of this application, the chip system may include a chip, or may include a chip and another discrete component.

A network device in embodiments of this application may be a device configured to communicate with the user equipment. For example, the network device may be a device that is in a communication network and that is configured to provide a service to the user equipment. In embodiments of this application, the communication network may include an IP multimedia subsystem (IP multimedia subsystem, IMS) network of an operator, may include an established communication network, or may include another communication network. This is not limited.

For example, the network device may include one or more of the following: a network exposure function (network exposure function, NEF) network element, a home subscriber server (home subscriber server, HSS), a serving-call session control function (serving-call session control function, S-CSCF) device, an access and mobility management function (access and mobility management function, AMF) network element, a unified data management (unified data management, UDM) network element, or an application server (application server). It may be understood that the application server may provide an application-layer service, for example, a video service, a navigation service, an e-commerce service, or a social communication service, to the user equipment (in other words, provide a service to an application client in the user equipment). A specific application-layer service is not limited in embodiments of this application.

A base station is mentioned in embodiments of this application for a plurality of times. It may be understood that the base station may cover the following names in a broad sense, or may be replaced with the following names, for example, a NodeB (NodeB), an evolved NodeB (evolved NodeB, eNB), a next generation NodeB (next generation NodeB, gNB), a relay station, an access point, a transmission reception point (transmission reception point, TRP), a transmission point (transmission point, TP), a primary station, a secondary station, a multi-standard radio (multi-standard radio, MSR) node, a home base station, a network controller, an access node, a radio node, a transmission node, a transceiver node, a baseband unit (baseband unit, BBU), a remote radio unit (remote radio unit, RRU), an active antenna unit (active antenna unit, AAU), a remote radio head (remote radio head, RRH), a central unit (central unit, CU), a distributed unit (distributed unit, DU), or a positioning node. The base station may be a macro base station, a micro base station, a relay node, a donor node, an analogue, or a combination thereof. The base station may alternatively be a communication module, a modem, or a chip that is disposed in the foregoing device or apparatus. The base station may alternatively be a mobile switching center, a device that plays functions of a base station in the D2D, V2X, and M2M communication, a network side device in a 6G network, a device that plays functions of a base station in a future communication system, or the like. The base station may support networks using a same access technology or different access technologies. A specific technology and a specific device form that are used by the network device are not limited in embodiments of this application. The base station may be fixed or mobile. For example, a helicopter or an uncrewed aerial vehicle may be configured as a mobile base station, and one or more cells may move with a location of the mobile base station. In other examples, the helicopter or the uncrewed aerial vehicle may be configured as a device that communicates with another base station.

For ease of understanding of embodiments of this application, a communication system applicable to embodiments of this application is first described in detail with reference to FIG. 1.

FIG. 1 is a diagram of a communication system applicable to an embodiment of this application. As shown in FIG. 1, the communication system may include one or more user equipments, for example, a user equipment 110 shown in FIG. 1. The communication system may further include one or more network devices, for example, a network device 120 shown in FIG. 1. Optionally, the communication system further includes an application server, for example, an application server 130 shown in FIG. 1. The user equipment may communicate with the network device. For example, the user equipment 110 may communicate with the network device 120. The user equipment may also communicate with the application server. For example, the user equipment 110 may communicate with the application server 130. The network device may also communicate with the application server. For example, the network device 120 communicates with the application server 130.

In an example, a device in the network device set 120 may be, for example, a device that is in a communication network and that is configured to provide a service to the user equipment. For example, the network device set 120 may include one or more of the following: a NEF network element, an HSS device, an S-CSCF device, an AMF network element, or a UDM network element. The following briefly describes the devices.

1. The NEF network element may be configured to securely expose, to the outside, a service, a capability, and the like that are provided by a 3rd generation partnership project (3rd generation partnership project, 3GPP) network functional entity.
2. The HSS device may be configured to process a main subscriber database of an IMS network entity that invokes a session.
3. The S-CSCF device may be configured to receive a communication request message sent by a sending end.
4. The AMF network element may be used for functions such as access control, mobility management, attach, and detach.
5. The UDM network element may be used for subscription data management of the UE, including storage and management of a UE identifier, access authorization of the UE, and the like.

It may be understood that FIG. 1 is merely a simplified diagram illustrated for ease of understanding, and this application is not limited thereto.

It may be further understood that a core network device in this application is a network element, for example, an S-CSCF device or an AMF device, in a core network. In an example, a mobile network includes three parts: a base station subsystem, a network subsystem, and a system support. The core network is usually in the network subsystem. Functions of the core network mainly include providing user connections, managing users, and bearing services. The core network may be used as an interface provided by a bearer network to an external network (Internet). In embodiments of this application, the core network device may further provide login information to a user equipment by using an uncharged traffic message, and perform authentication on login information sent by an application server.

It may be further understood that the network elements, such as the AMF network element, the NEF network element, the UDM network element, and other functional network elements, in embodiments of this application may be understood as network elements configured to implement different functions, and may be combined into a network slice as required. These network elements may be independent hardware devices, may be integrated into a same hardware device, may be network elements in a hardware device, may be software functions running on dedicated hardware, or may be virtualization function modules instantiated on a platform (for example, a cloud platform). Specific forms of the network elements are not limited in this application. It may be further understood that the foregoing names are defined merely for distinguishing between different functions, and should not constitute any limitation on this application. This application does not exclude a possibility of using other names in the 6G network and other networks in the future. For example, terms related to some or all of the network elements in the foregoing 5G network may still be used in the 6G network.

With continuous improvement of interaction experience of users, a login mode, namely, password-free login, emerges. The password-free login allows users to log in without manually entering accounts and passwords. The password-free login may be applied to many scenarios, for example, service scenarios such as registration with, login to, and payment in an enterprise application (application, APP). The password-free login mode better meets requirements of the users on the interaction experience. This mode can increase a login speed and improve login efficiency, and can also avoid problems caused by forgetting the passwords or entering incorrect passwords by the users.

Figure 2:
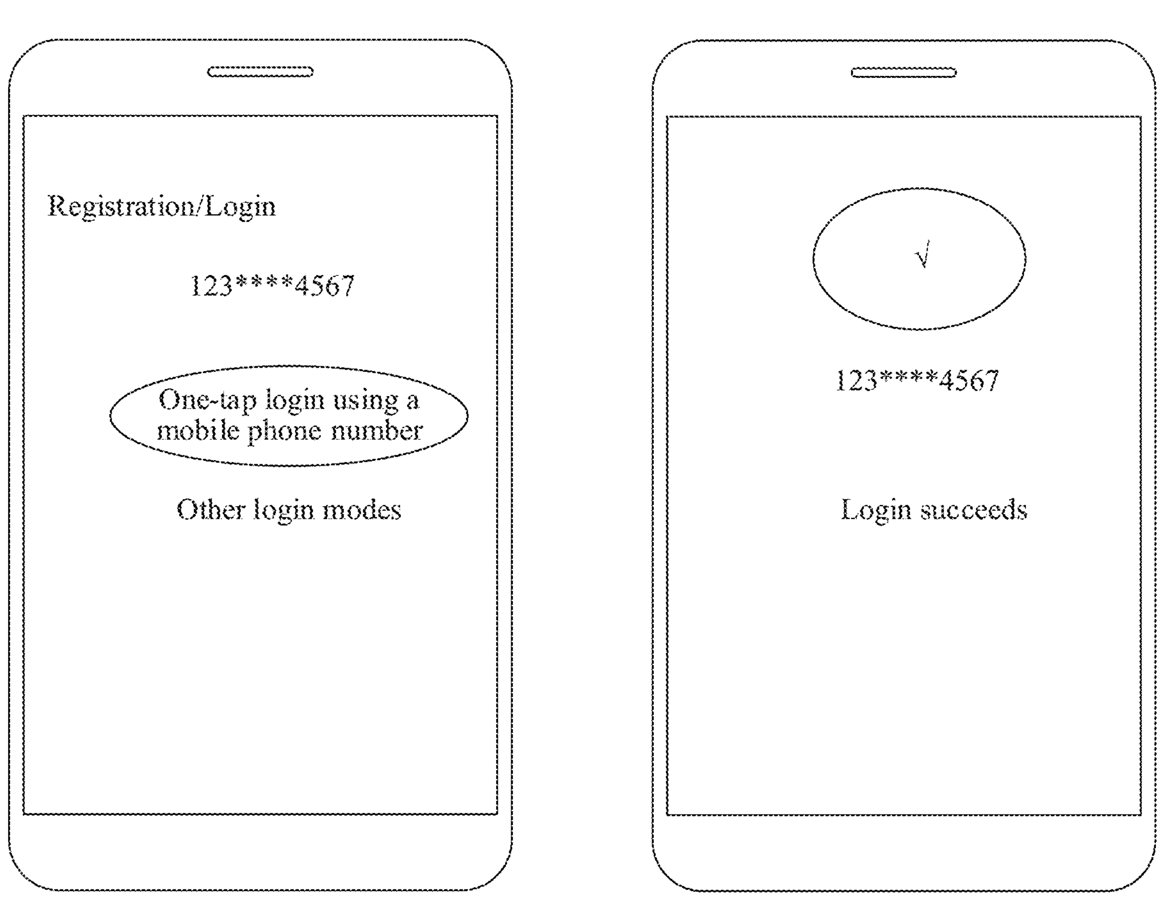
FIG. 2 is a diagram of password-free login.

FIG. 2 is a diagram of password-free login. As shown in FIG. 2, a possible password-free login mode is as follows: After a user equipment presents a password-free login page, a user may tap a "One-tap login using a mobile phone number" button to complete the password-free login. Optionally, if there is a service agreement on the password-free login page, the user may tick the service agreement on the password-free login page, and tap the "One-tap login using a mobile phone number" button to complete the password-free login. In this way, a complex input step can be avoided, there is no SMS verification code or indistinct image verification code, and a login operation can be completed by tapping one button. This brings great convenience to the user.

However, in an existing password-free login procedure, a mobile data traffic service subscribed to by a user needs to be used. If the user does not subscribe to the mobile network data traffic service, or a mobile data traffic switch is off, the password-free login cannot be performed.

This application provides a manner of obtaining, based on signaling, for example, session initiation protocol (session initiation protocol, SIP) signaling or non-access stratum (non-access stratum, NAS) signaling, that generates no to-be-charged traffic, information needed for login. In this way, the password-free login can be implemented, and a network resource of a telecommunications operator can also be fully utilized.

For ease of understanding of embodiments of this application, terms in this application are described briefly.

1. Communication Number

A user is associated with at least one subscriber identity module, and the subscriber identity module may be, for example, a card (for example, a network card or a calling card). In an example, the subscriber identity module may be, for example, any one of the following: a subscriber identity module (subscriber identity module, SIM), a universal subscriber identity module (universal subscriber identity module, USIM), an embedded SIM (Embedded-SIM, eSIM), a user identity model (user identity model, UIM), an IP multimedia service identity module (IP multimedia service identity module), or a code division multiple access (code division multiple access, CDMA) subscriber identity module (CDMA subscriber identity module, CSIM).

The communication number is a number bound to the subscriber identity module (or an independent communication unit), and may be for communicating with another user. In an example, the communication number may be a phone number or a mobile phone number that is widely used currently, is a user identifier in a communication network, and is for communicating with another user. The communication number may be a number including N digits, where Nis an integer greater than 1. For example, N=11. For another example, N=4. For another example, N=8. For another example, N=12. A value of N is not limited. It may be understood that the communication number may alternatively be represented in another form, for example, represented by a character string. This is not limited.

In a possible form, the communication number is a mobile subscriber ISDN number (mobile subscriber ISDN number, MSISDN). The ISDN is an integrated service digital network (integrated service digital network, ISDN).

In this application, for a user, a quantity of communication numbers of the user is not limited. In a possible implementation, the quantity of communication numbers of the user (for example, a quantity of MSISDNs) is the same as a quantity of subscriber identity modules.

2. Communication Number Mask

In embodiments of this application, for ease of description, a communication number in which a part of digits are hidden is referred to as the communication number mask. Assuming that the communication number is a number including N digits, the communication number mask may be obtained by hiding M digits in the N digits, where M is an integer greater than or equal to 1 and less than N. For example, if the communication number is 18612345678, the communication number mask may be, for example, 186****5678.

In this application, for a user, a quantity of communication number masks of the user is not limited. In a possible implementation, the quantity of communication number masks (for example, a quantity of MSISDN masks) is the same as a quantity of communication numbers.

It may be understood that the communication number mask may be one type of anonymized identifier. In other words, the communication number mask in the following may be replaced with an anonymized identifier.

3. Identifier of a User

Before the identifier of the user is introduced, anonymization processing is first briefly introduced.

The anonymization processing means anonymizing a part of information, for example, changing a part or all of the information to "***", so that real content of the information is not completely exposed.

For example, if a communication number of the user is a number including N digits, anonymization processing on the communication number means hiding M digits in the N digits, where M is an integer greater than or equal to 1 and less than N. For example, if the communication number is 18612345678, 186****5678 may be obtained through the anonymization processing on the communication number.

For another example, if a nickname of the user is "Alice", anonymization processing on the nickname of the user means hiding a part of information in the nickname of the user. For example, "*ice" may be obtained through the anonymization processing on the nickname of the user.

In embodiments of this application, a first identifier, a second identifier, and a third identifier are all identifiers related to a user corresponding to a user equipment. The first identifier may be a user identifier on which anonymization processing is not performed, and identifies the user corresponding to the user equipment. The second identifier may be a result obtained through the anonymization processing on the first identifier. In an example, the first identifier may be, for example, a communication number, a name, a nickname, a mailbox, or the like of the user. Correspondingly, the second identifier may be an identifier obtained through the anonymization processing on the foregoing identifier. It may be understood that the foregoing examples of the first identifier are examples for description, and no limitations are imposed.

For ease of description, the first identifier and the second identifier are collectively referred to as display identifiers below, and the third identifier is referred to as a verification identifier. It may be understood that the display identifier and the verification identifier are names for differentiation, and the names do not limit the protection scope of embodiments of this application. The following describes the display identifier and the verification identifier.

(1) The display identifier is an identifier displayed on a login page before a user equipment logs in to an application server. The display identifier is displayed on the login page, so that a user can learn which identifier of the user is to be used by the user equipment to perform password-free login, and further determine whether to perform login by using an identifier corresponding to the display identifier. In this way, login experience of the user can be improved. In addition, if the display identifier displayed on the login page is the second identifier, leakage of the user identifier of the user to a third-party entity can be further avoided.

(2) The verification identifier (namely, the third identifier) is an identifier returned by a core network device to the application server after the core network device verifies login information, and the identifier may identify the user. In other words, the application server can identify the user based on the verification identifier.

In an example, the verification identifier is a communication number (for example, an MSISDN) of the user, or may be an identifier allocated to the user, and the user can be identified by using the identifier.

It may be understood that functions of the display identifier and the verification identifier are different. It may be further understood that the display identifier and the verification identifier may be the same or may be different. This is not limited.

4. To-be-Charged Traffic

The "to-be-charged traffic" in embodiments of this application is data traffic that is detected by a data gateway (for example, a UPF network element) in a telecommunications network and that should be charged.

5. Mobile Data Traffic Service

The "mobile data traffic service" in embodiments of this application is a network service provided by an operator to a user. In a process in which a user equipment (for example, a mobile phone) accesses a data network (for example, the Internet) through the network service, a data gateway of the operator may detect data traffic that should be charged, namely, the to-be-charged traffic.

It may be understood that the term "and/or" in this specification describes only an association relationship between associated objects and indicates that three relationships may exist. For example, A and/or B may represent the following three cases: Only A exists, both A and B exist, and only B exists. In addition, the character "/" in this specification generally indicates an "or" relationship between associated objects.

The foregoing briefly describes the terms in this application, and details are not described again in the following embodiments.

With reference to the accompanying drawings, the following describes in detail a method provided in embodiments of this application.

Figure 3:
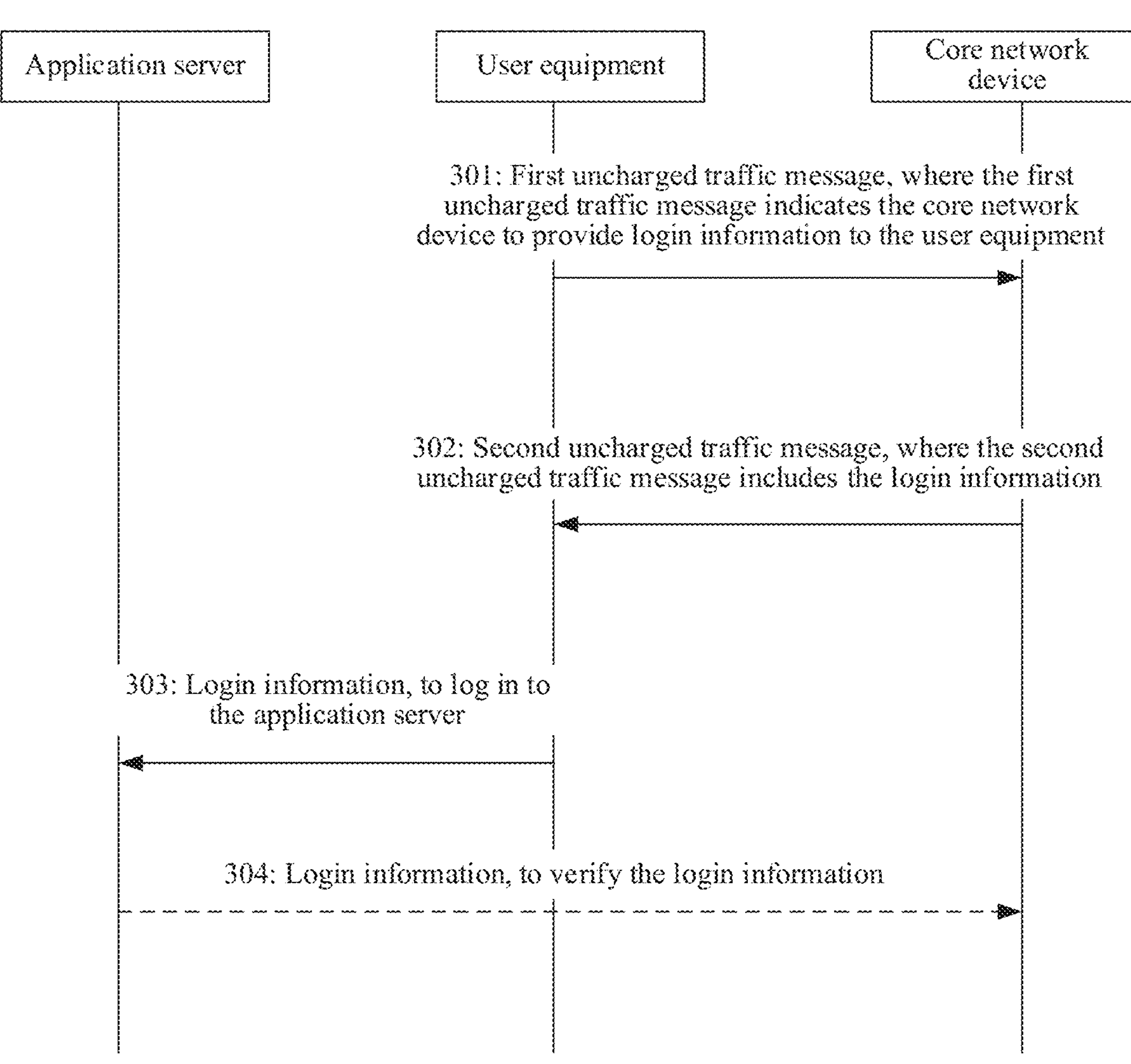
FIG. 3 is a diagram of a communication method 300 according to an embodiment of this application.

FIG. 3 is a diagram of a communication method 300 according to an embodiment of this application. The method 300 may include the following steps.

301: A user equipment sends a first uncharged traffic message to a core network device, where the first uncharged traffic message is for triggering the core network device to send a second uncharged traffic message to the user equipment.

Optionally, the first uncharged traffic message indicates the core network device to provide login information to the user equipment. The login information is information needed by the user equipment to log in to an application server.

In an example, the first uncharged traffic message may indicate the core network device to provide the login information to the user equipment. Based on this example, after receiving the first uncharged traffic message, the core network device may determine to provide the login information to the user equipment.

In another example, the first uncharged traffic message includes indication information, and the indication information indicates the core network device to provide the login information to the user equipment. Based on this example, after receiving the first uncharged traffic message, the core network device may determine, based on the indication information in the first uncharged traffic message, to provide the login information to the user equipment. The indication information may be implemented by using one or more bits. For example, it is assumed that the core network device is indicated by using one bit to provide the login information to the user equipment. If the bit in the first uncharged traffic message is set to "1", it indicates that the first uncharged traffic message indicates the core network device to provide the login information to the user equipment. It should be understood that the foregoing is merely an example for description, and no limitations are imposed.

It may be understood that, that the first uncharged traffic message is for triggering the core network device to send a second uncharged traffic message to the user equipment may alternatively be replaced with: The first uncharged traffic message is for triggering the core network device to send the login information to the user equipment.

302: The user equipment receives the second uncharged traffic message from the core network device, where the second uncharged traffic message includes the login information.

303: The user equipment sends the login information to the application server, to log in to the application server.

Both the first uncharged traffic message and the second uncharged traffic message are messages that are transmitted via a base station without generating to-be-charged traffic.

Optionally, the method 300 further includes step 304: The application server sends the login information to the core network device, to verify the login information.

For example, the application server sends a login authentication message to the core network device, where the login authentication message includes the login information. It may be understood that the application server may directly send the login information to the core network device, or may indirectly send the login information to the core network device. That the application server indirectly sends the login information to the core network device indicates: The application server sends the login information to the core network device through another device or network element (for example, a NEF network element). For example, the application server sends the login information to the NEF network element, and the NEF network element sends the login information to the core network device.

According to this embodiment of this application, the user equipment sends the first uncharged traffic message to the core network device, where the first uncharged traffic message may be for triggering the core network device to send the login information to the user equipment. The user equipment receives the second uncharged traffic message from the core network device, where the second uncharged traffic message carries the login information. In this way, the user equipment may log in to the application server based on the login information. Both the first uncharged traffic message and the second uncharged traffic message generate no to-be-charged traffic. Therefore, obtaining, by using the messages that generate no to-be-charged traffic, the information needed for logging in to the application server can implement password-free login by using a network resource of a telecommunications operator, and can also be applied to more scenarios.

For example, the solution in this embodiment of this application is applicable to at least the following two scenarios.

Scenario 1: A user subscribes to a mobile data traffic service from an operator, but a mobile data traffic switch of the user equipment is off or the mobile data traffic service is overdue.

Scenario 2: A user does not subscribe to a mobile data traffic service from an operator, and a subscriber identity module (for example, a SIM card) associated with the user may be only for a voice call, and cannot be for accessing a network through the mobile data traffic service. This case is common for a "dual-SIM dual-standby" mobile phone. The mobile data traffic service may not be subscribed to for one of SIM cards, but the user may still want to implement the password-free login by using a mobile phone number corresponding to the SIM card.

It may be understood that an application scope of this embodiment of this application is not limited to the foregoing two scenarios. This embodiment of this application is applicable to any scenario in which the user equipment cannot obtain the login information through the mobile data traffic service.

The following describes in detail the solution in this embodiment of this application.

For example, for the first uncharged traffic message and the second uncharged traffic message, there are at least the following two solutions.

Solution 1: The first uncharged traffic message and the second uncharged traffic message are user plane (user plane) messages.

The user plane message (or user plane signaling) is a message or signaling that passes through a user plane data gateway. In an example, there may be two types of user plane messages: a message that generates to-be-charged traffic and a message that generates no to-be-charged traffic. In this embodiment of this application, both the first uncharged traffic message and the second uncharged traffic message are user plane messages that are transmitted via the base station and the user plane data gateway without generating the to-be-charged traffic. For example, the user plane data gateway may be a UPF network element defined in a 3GPP standard specification. It may be understood that in a 5G communication system, the user plane data gateway may be the UPF network element. In a future communication system, the user plane data gateway may still be the UPF network element, or may have another name. This is not limited in this application.

Optionally, the first uncharged traffic message and the second uncharged traffic message are SIP messages (also referred to as SIP signaling). In an example, the core network device is a call session control function device, and the call session control function device may be, for example, an S-CSCF device. The SIP signaling may be initiated by the UE and accessed to the network through an IMS access point (access point, AP). When the SIP signaling passes through the UPF and after the UPF identifies that a signaling type is the SIP signaling, the UPF may not collect statistics on traffic generated by the SIP signaling; or collect statistics on traffic generated by the SIP signaling but not count the traffic toward to-be-charged traffic. In conclusion, no to-be-charged traffic is generated. The following describes two possible forms.

In a possible form, the first uncharged traffic message is a SIP request message (for example, a SIP query message). Correspondingly, the second uncharged traffic message is a response to the SIP request message (for example, a response to the SIP query message). For example, the SIP request message (for example, the SIP query message) may be, for example, a SIP OPTIONS message. In this form, the user equipment sends the SIP request message to the core network device (for example, the call session control function device) in step 301. Specifically, the following provides descriptions in detail with reference to a method 400.

In another possible form, the first uncharged traffic message is a SIP registration (SIP Registration) message. Correspondingly, the second uncharged traffic message is a SIP registration response (SIP Registration Response) message. In this form, the user equipment sends the SIP registration message to the core network device (for example, the call session control function device) in step 301, and the user equipment receives the SIP registration response message from the core network device in step 302.

Solution 2: The first uncharged traffic message and the second uncharged traffic message are control plane (control plane) messages.

The control plane message (or signaling) may not be counted toward traffic. Therefore, no to-be-charged traffic is generated. Therefore, in this embodiment of this application, the first uncharged traffic message and the second uncharged traffic message may be control plane messages. Alternatively, this may be understood as: The first uncharged traffic message and the second uncharged traffic message are control plane messages transmitted via the base station but not via a user plane data gateway.

Optionally, the first uncharged traffic message and the second uncharged traffic message are NAS messages. In an example, the core network device is an access management network element, for example, an AMF network element. It may be understood that in a 5G communication system, the access management network element may be the AMF network element. In a future communication system, the access management network element may still be the AMF network element, or may have another name. This is not limited in this application. The following describes two possible forms.

In a possible form, the first uncharged traffic message is a NAS request message. Correspondingly, the second uncharged traffic message is a response to the NAS request message. NAS signaling is a control plane message of a core network. In this form, the user equipment sends a NAS request message to the core network device (for example, the AMF network element) in step 301. Specifically, the following provides descriptions in detail with reference to a method 500.

In another possible form, the first uncharged traffic message is a NAS registration (NAS Registration) message. Correspondingly, the second uncharged traffic message is a NAS registration accept (NAS Registration Accept) message. In this form, the user equipment sends the NAS registration message to the core network device in step 301, and the user equipment receives the NAS registration accept message from the core network device (for example, the AMF network element) in step 302.

Optionally, the second uncharged traffic message further includes an authentication address of the login information. The authentication address of the login information may indicate an address of a device that is to perform authentication on the login information, an address of a device that is to provide an interface service for authentication on the login information, or an address of a device that is to receive the login information from the application server. In a possible form, the authentication address of the login information is an address of a network exposure network element. In another possible form, the authentication address of the login information is other address information, and an address of a network exposure network element may be determined based on the other address information. In the foregoing two possible forms, the application server may send the login information to the network exposure network element based on the authentication address of the login information, and then the network exposure network element sends the login information to the core network device. The core network device performs verification. It may be understood that the foregoing is an example for description, and this embodiment of this application is not limited thereto. For example, the authentication address of the login information is an address of the core network device, and the application server sends the login information to the core network device, so that the core network device verifies the login information.

In this embodiment of this application, the login information may be used by the user equipment to log in to the application server. For example, the user equipment sends a login request message to the application server, where the login request message carries the login information. After receiving the login information, the application server may verify the login information. If the verification succeeds, the application server may allow (or agree) the user equipment to log in. In an example, the login information may be, for example, a token (token) (or may be referred to as a ticket).

The login information is the information needed by the user equipment to log in to the application server. The login information may be provided by the core network device to the user equipment (for example, generated by the core network device). The core network device may verify an identity of the application server. For example, the application server may negotiate a key with the core network device in advance. The key may be used by the core network device to verify the identity of the application server when the application server requests the core network device to verify the login information. After completing the verification of the identity of the application server, the core network device may start to verify the login information. In addition, after completing the verification of the login information, the core network device may return a verification identifier (for example, a communication number of the user) to the application server.

A form of the login information (for example, the token) is not limited in embodiments of this application.

In a possible form, the login information is in a form of a character string (for example, a randomly generated character string). For example, the character string may include a letter or a digit. A length of the character string may be X. X is an integer greater than 1. For example, X=32.

In another possible form, the login information may include at least one of the following information and/or a result of encrypting or signing, by the core network device, the at least one of the following information: information about the user equipment, information about the user corresponding to the user equipment, the authentication address of the login information, an application scope of the login information, verification information for the login information, or a validity period of the login information. The core network device encrypts or signs at least one of the foregoing information, so that security of the at least one of the foregoing information can be improved. For example, the foregoing information may carry a digital signature of the core network device. After receiving the foregoing information, the core network device may first verify the digital signature based on a key of the core network device. If the verification succeeds, the core network device may obtain the foregoing information, and then verify the foregoing information. If the verification fails, it may be considered that verification fails.

Each item is described as follows:

- The information about the user equipment may represent information about the user equipment that uses the login information.
- The information about the user corresponding to the user equipment may represent information about the user that uses the login information.
- The authentication address of the login information may indicate an execution subject of the verification, namely, an execution subject that is to receive the login information.
- The application scope (scope) of the login information indicates an action scope of the login information.
- The validity period of the login information or expiration (expiration) information of the login information indicates a valid use period of the login information. For example, the validity period of the login information may be T minutes (T is a number greater than 0, for example, T is 1, or T is 5), and is one-time.
- The verification information for the login information may be for verifying whether the login information is generated by the core network device. The verification information may be, for example, an agreed verification code (or an agreed secret code).

In a possible case, the login information includes the application scope of the login information, and the application scope of the login information is "for requesting to obtain the communication number of the user from the core network device". In this case, the user equipment sends the login request message to the application server, where the login request message carries the login information. After receiving the login information, the application server sends the login information to the core network device. After receiving the login information, the core network device may learn, based on the application scope of the login information, that the communication number of the user is to be sent to the application server.

In another possible case, the login information includes the verification information for the login information, and the verification information for the login information is a verification code (for example, 1234) provided by the core network device. In this case, the user equipment sends the login request message to the application server, where the login request message carries the login information and the verification code, namely, 1234. After receiving the login information, the application server sends the login information and the verification code, namely, 1234, to the core network device. After receiving the login information, the core network device may learn, based on the verification code, namely, 1234, that the login information is provided by the core network device.

In another possible case, the login information includes the validity period of the login information. In this case, the user equipment sends the login request message to the application server, where the login request message carries the login information. After receiving the login information, the application server sends the login information to the core network device. After receiving the login information, the core network device may determine, based on the validity period of the login information, whether the login information is valid. If the login information is valid, the verification succeeds, and the application server may be notified that the verification succeeds. If the login information has expired, the verification fails, and the application server may be notified that the verification fails.

It may be understood that the foregoing is an example for description. In an actual application, more information may be carried in the login information based on an actual case.

It may be further understood that a specific manner of generating the login information is not limited in embodiments of this application. For example, the core network device encrypts or signs at least one of the following information: the information about the user equipment, the information about the user corresponding to the user equipment, the authentication address of the login information, the application scope of the login information, the verification information for the login information, or the validity period of the login information. Then, the core network device sends encrypted or signed information to the user equipment. For another example, the core network device encodes at least one of the foregoing information, and then sends encoded information to the user equipment.

For example, the following enumerates possible manners in which the core network device generates the login information. For example, the login information may include three parts: a header (Header), a payload (Payload), and a signature (Signature). The header may be in a JSON format, and the header includes an attribute of the login information, for example, includes a signature algorithm or a login information type (for example, a token type). The payload may be in the JSON format, and for example, may include at least one of the following information: the information about the user equipment, the information about the user corresponding to the user equipment, the authentication address of the login information, the application scope of the login information, the verification information for the login information, or the validity period of the login information. For another example, the login information is "character string 1. character string 2. character string 3", where the character string 1=Base64_encode (Header) (in other words, the character string 1 may be encoded in a Base64 encoding mode), the character string 2=Base64_encode (Payload), and the character string 3-Sign (character string 1. character string 2, key) (in other words, the character string 3 is obtained by signing the character string 1 and the character string 2 by using a key.) It may be understood that the foregoing is an example for description. How to generate the login information and a specific form of the login information are not limited in embodiments of this application.

In addition, there are also many manners of parsing the login information. This is not limited. In an example, when parsing the login information, the core network device may perform the following steps: (1) obtaining the attribute of the login information, for example, obtaining attribute information of the login information by using Base64_decode (for example, the foregoing character string 1); (2) calculating a signature: a character string 4=Sign (character string 1. character string 2, key); (3) verifying the signature: comparing the character string 4 with the character string 3 in the login information, where if the character string 4 is consistent with the character string 3, the signature verification succeeds; (4) obtaining the foregoing information (for example, at least one of the information about the user equipment, the information about the user corresponding to the user equipment, the authentication address of the login information, the application scope of the login information, the verification information for the login information, or the validity period of the login information) by using Base64_decode (for example, the foregoing character string 2); and (5) verifying the foregoing information.

It may be understood that how to generate the login information and how to parse the login information are not limited in embodiments of this application.

Optionally, the method 300 further includes: The user equipment obtains a display identifier. In an example, the display identifier may be carried in a third uncharged traffic message. For the third uncharged traffic message, refer to the foregoing first uncharged traffic message and second uncharged traffic message. Details are not described herein. It may be understood that the third uncharged traffic message may be the same as the second uncharged traffic message, in other words, the display identifier and the login information may be transmitted by using a same uncharged traffic message, to reduce signaling overheads. Alternatively, the third uncharged traffic message may be different from the second uncharged traffic message, in other words, the display identifier and the login information may be transmitted by using different uncharged traffic messages.

Display identification information may be displayed on a login page when the user equipment logs in to the application server. The display identification information is displayed on the login page, so that the user can learn which identifier of the user (assuming that the user has a plurality of identifiers) is to be used by the user equipment to perform password-free login, and further determine whether to perform login by using an identifier corresponding to the display identifier. In this way, login experience of the user can be improved.

In a first possible case, the display identification information is the communication number of the user. In this case, when the user equipment logs in to the application server, the communication number of the user is displayed on the login page, to improve the login experience of the user.

Optionally, in this case, after receiving the communication number of the user, the user equipment may generate a communication number mask of the user. In this way, the communication number mask of the user is displayed on the login page. This can improve the login experience of the user, and can also avoid leakage of a user identifier of the user to a third-party entity.

In this case, optionally, the display identifier may be carried in the second uncharged traffic message, or may be carried in another uncharged traffic message (for example, the following registration message). This is not limited.

In a second possible case, the display identification information is a communication number mask of the user. In this case, when the user equipment logs in to the application server, the communication number mask of the user is displayed on the login page. This can improve the login experience of the user, and can also avoid leakage of a user identifier of the user to a third-party entity.

In this case, optionally, that the user equipment obtains a display identifier includes: The user equipment receives the display identifier from the core network device. Alternatively, the user equipment receives a user identifier, and performs anonymization processing on the user identifier to obtain the display identifier. The user identifier or the display identifier may be carried in the second uncharged traffic message, or may be carried in another uncharged traffic message (for example, the following registration message). This is not limited.

It may be understood that the foregoing is an example for description, and no limitations are imposed.

Optionally, the method 300 further includes: The user equipment sends a registration message to the core network device, where the registration message is for registering the user equipment with a communication network. The user equipment receives a response to the registration message from the core network device, where the response to the registration message includes display identification information, and the display identification information is displayed before the user equipment logs in to the application server. Both the registration message and the response to the registration message are messages that are transmitted via the base station without generating to-be-charged traffic.

In a first possible case, the display identification information is the communication number of the user. Optionally, in this case, after receiving the communication number of the user, the user equipment may generate a communication number mask of the user. In this way, the communication number mask of the user may be displayed on the login page. This can improve the login experience of the user, and can also avoid leakage of a user identifier of the user to a third-party entity.

In a second possible case, the display identification information is a communication number mask of the user. In this case, when the user equipment logs in to the application server, the communication number mask of the user may be displayed on the login page. This can improve the login experience of the user, and can also avoid leakage of a user identifier of the user to a third-party entity.

Optionally, the method 300 further includes: The core network device receives a login authentication message from the application server, where the login authentication message includes the login information. The core network device sends a verification identifier to the application server, where the verification identifier is determined based on the login information. After receiving the login request message of the user, the application server may send the login authentication message to the core network device.

The verification identifier may identify the user. In other words, the application server may identify the user based on the verification identifier. For example, the verification identifier is the communication number (for example, an MSISDN) of the user. It may be understood that the foregoing is an example for description, and no limitations are imposed. For example, an identifier may alternatively be allocated to the user, and the user may be identified by the identifier.

In a possible implementation, if the core network device authenticates the login information, the core network device sends the verification identifier to the application server. That the core network device performs authentication on (or verifies) the login information means: The core network device verifies validity of the login information. In an example, that the core network device verifies the login information may include, for example, at least one of the following: The core network device verifies whether the login information has expired, or the core network device verifies whether the core network device has permission to verify the login information. For example, if the login information has not expired, it may be considered that the verification succeeds; or if the login information has expired, it may be considered that the verification fails. For another example, if the core network device determines that the core network device has permission to verify the login information, it may be considered that the verification succeeds; or if the core network device determines that the core network device has no permission to verify the login information, it may be considered that the verification fails.

Optionally, the core network device may determine the verification identifier based on the login information and a correspondence. The correspondence includes a correspondence between the verification identifier and the login information.

In a possible implementation, the core network device stores the correspondence between the login information and the verification identifier. In this case, after receiving the login authentication message from the application server, the core network device may determine the verification identifier based on the locally stored correspondence and the login information carried in the login authentication message.

In another possible implementation, another device stores the correspondence between the login information and the verification identifier. In this case, for example, after receiving the login authentication message from the application server, the core network device may request the correspondence from the another device. After receiving the request, the another device sends the correspondence to the core network device. The core network device determines the verification identifier based on the received correspondence and the login information carried in the login authentication message. For another example, after receiving the login authentication message from the application server, the core network device may request the verification identifier from the another device, where the request may carry the login information. After receiving the request, the another device determines the verification identifier based on the correspondence and the login information, and sends the verification identifier to the core network device.

In an example, there is the correspondence between the login information and the verification identifier. In an example, using an example in which the login information is the token, the correspondence between the login information and the verification identifier may exist in a form of Table 1.

TABLE 1

| Token | Verification identifier |
|---|---|
| Token #1 | Identifier #1 |
| Token #2 | Identifier #2 |
| Token #3 | Identifier #3 |

It may be understood that Table 1 is merely an example for description, and no limitations are imposed. Any variation of Table 1 is applicable to this application. For example, Table 1 may further include more tokens and verification identifiers.

Figure 4:
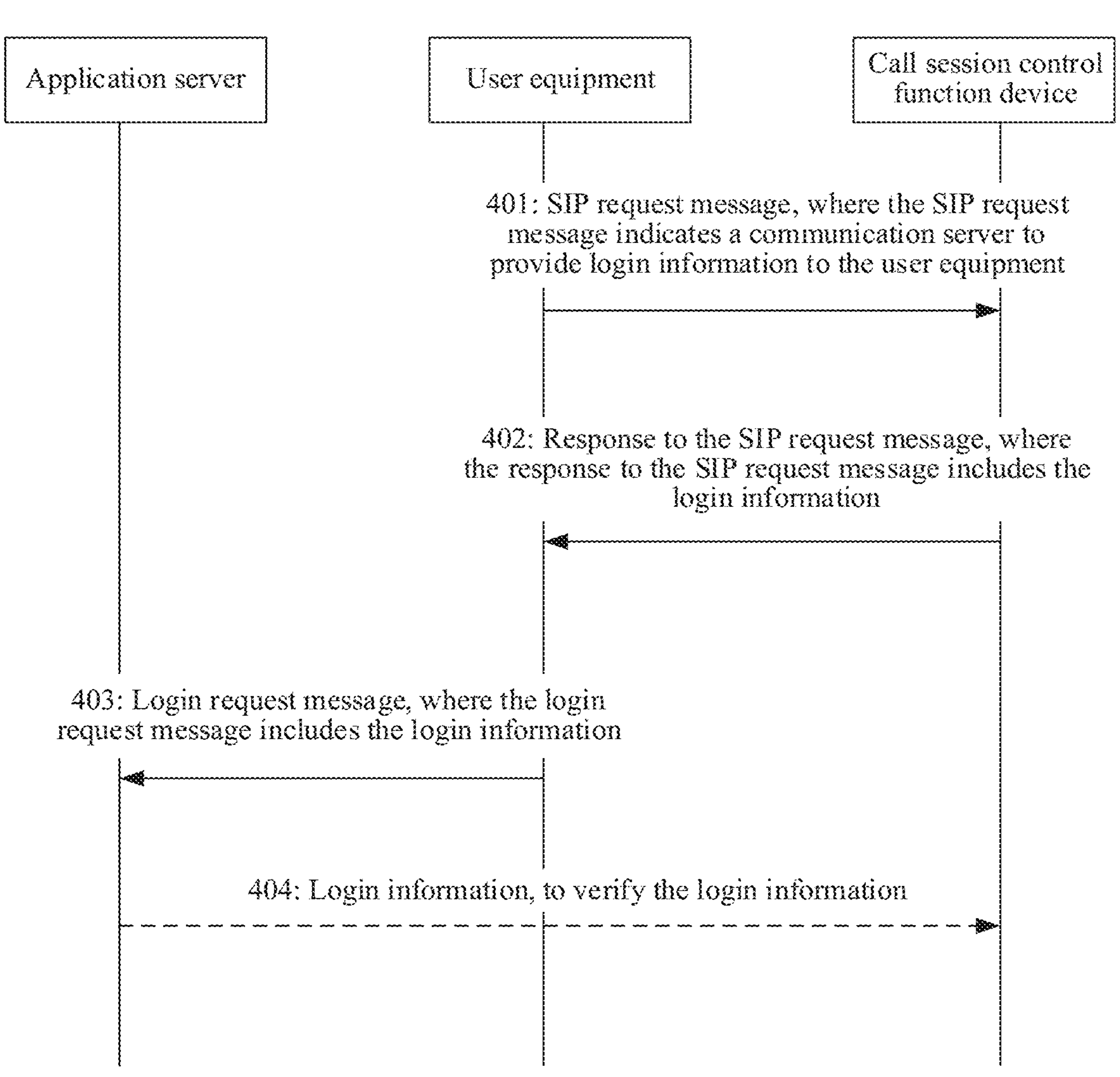
FIG. 4 is a diagram of a communication method 400 according to an embodiment of this application.

FIG. 4 is a diagram of a communication method 400 according to an embodiment of this application. In an example, the method 400 may be applied to implement the solution 1 in the method 300. For terms in the method 400, refer to the term part and the descriptions in the method 300. Details are not described herein again. Assuming that a first uncharged traffic message and a second uncharged traffic message are SIP signaling, the method 400 may include the following steps.

401: A user equipment sends a SIP request message to a call session control function device, where the SIP request message indicates the call session control function device to provide login information to the user equipment.

The login information is information needed by the user equipment to log in to an application server. For example, the login information is a token.

In step 401, the user equipment sends the SIP request message to the call session control function device. In an example, the call session control function device is an S-CSCF device.

402: The user equipment receives a response to the SIP request message from the call session control function device, where the response to the SIP request message includes the login information.

In step 402, the user equipment receives the response to the SIP request message from the call session control function device.

403: The user equipment sends a login request message to the application server, where the login request message includes the login information.

In step 403, the user equipment sends the login request message to the application server.

Optionally, the method 400 further includes step 404: The application server sends the login information to the call session control function device, to verify the login information. It may be understood that the application server may directly send the login information to the call session control function device, or may indirectly send the login information to the call session control function device. That the application server indirectly sends the login information to the call session control function device indicates: The application server sends the login information to the call session control function device through another device or network element (for example, a NEF network element). For example, the application server sends the login information to the NEF network element, and the NEF network element sends the login information to the call session control function device.

According to this embodiment of this application, because transmission of the SIP signaling may not generate to-becharged traffic, obtaining, through exchange of the SIP signaling between the user equipment and the call session control function device, the login information needed for logging in to the application server can implement password-free login, and can also be applied to more scenarios. For example, convenient and secure password-free login can also be performed when mobile network data traffic of the user equipment of a user is switched off.

Optionally, the method 400 further includes: The user equipment sends a registration message to the call session control function device, where the registration message is used by the user equipment to register with a communication network according to a SIP protocol. The user equipment receives a response to the registration message from the call session control function device, where the response to the registration message includes a display identifier. The display identifier may be obtained through exchange of SIP signaling between the user and the call session control function device. For the display identifier, refer to the descriptions in the method 300. Details are not described herein again.

Optionally, the method 400 further includes: The call session control function device receives a login authentication message from the application server, where the login authentication message includes the login information. The call session control function device sends a verification identifier to the application server, where the verification identifier is determined based on the login information. It may be understood that the verification identifier provided by the call session control function device to the application server is used by the application server to identify the user. The verification identifier may be the same as or different from the display identifier received by the user equipment when the user equipment registers with the call session control function device.

For example, after receiving the login request of the user, the application server may determine an authentication address (for example, an address of the NEF network element in an operator network) of the login information, and further send the login authentication message to the NEF network element. The NEF network element forwards the login authentication message to the call session control function device. In a possible implementation, the login request includes the authentication address of the login information, and the application server may directly obtain the authentication address of the login information based on the login request. It may be understood that the foregoing implementation is an example for description, and this embodiment of this application is not limited thereto. For example, the application server queries the authentication address of the login information based on the login information in the login request.

In a possible implementation, if the call session control function device authenticates the login information, the call session control function device sends the verification identifier to the application server. In an example, the call session control function device determines the verification identifier based on the login information and a correspondence, where the correspondence includes a correspondence between the verification identifier and the login information. For details, refer to the descriptions in the method 300. The details are not described herein again.

It may be understood that the method 400 is an example for description, and embodiments of this application are not limited thereto. For example, the SIP request message in the method 400 may be replaced with a SIP registration message, and the response to the SIP request message may be replaced with a SIP registration response message. For another example, the SIP request message in the method 400 may be replaced with a SIP message (or a SIP query message), and the response to the SIP request message may be replaced with a response to the SIP message (or a SIP query response message).

Figure 5:
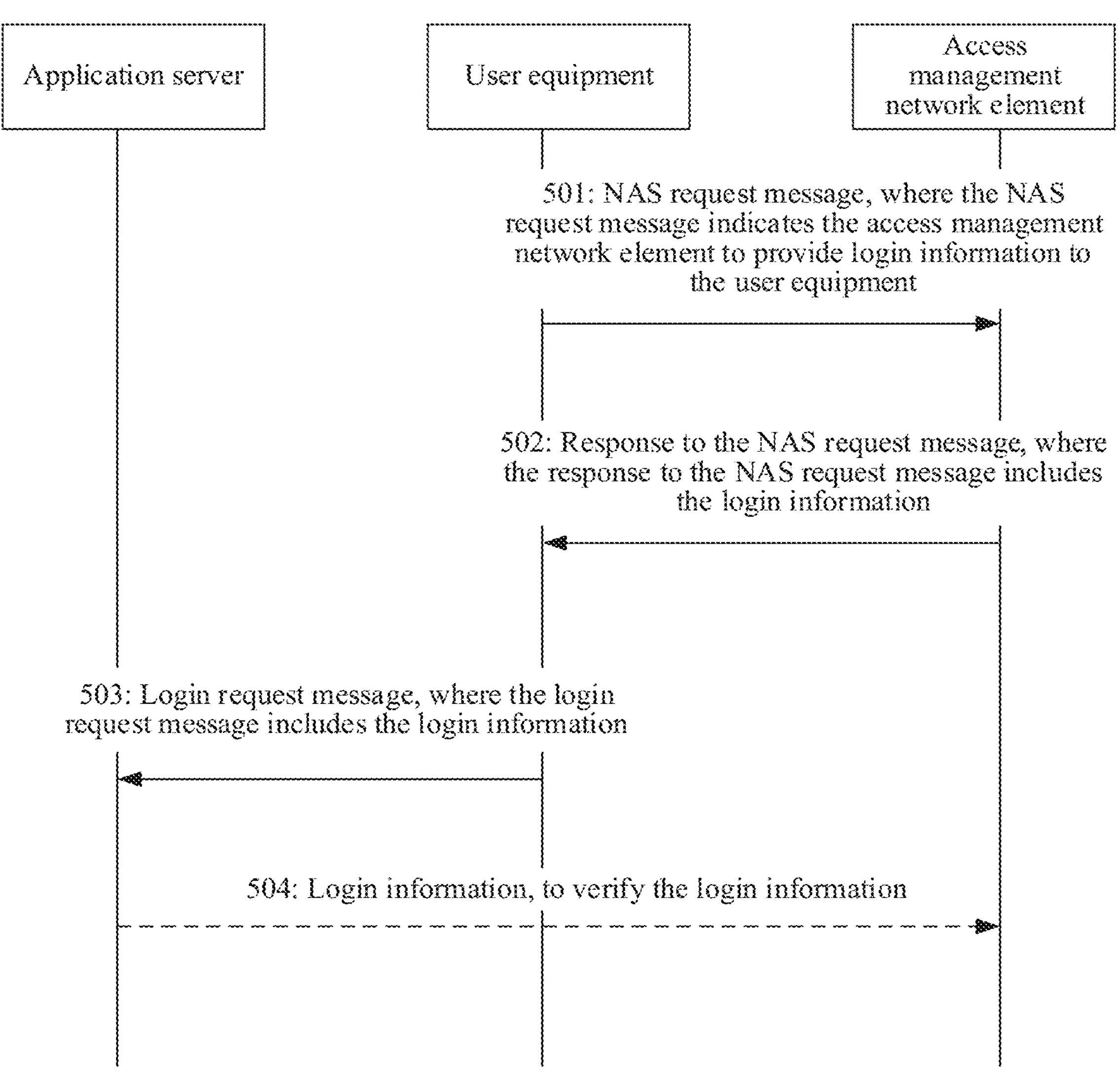
FIG. 5 is a diagram of a communication method 500 according to an embodiment of this application.

FIG. 5 is a diagram of a communication method 500 according to an embodiment of this application. In an example, the method 500 may be applied to implement the solution 2 in the method 300. For terms in the method 500, refer to the term part and the descriptions in the method 300. Details are not described herein again. Assuming that a first uncharged traffic message and a second uncharged traffic message are NAS signaling, the method 500 may include the following steps.

501: A user equipment sends a NAS request message to an access management network element, where the NAS request message indicates the access management network element to provide login information to the user equipment.

The login information is information needed by the user equipment to log in to an application server. For example, the login information is a token.

In step 501, the user equipment sends the NAS request message to the access management network element. In an example, the access management network element is an AMF network element.

502: The user equipment receives a response to the NAS request message from the access management network element, where the response to the NAS request message includes the login information.

In step 502, the user equipment receives the response to the NAS request message from the access management network element.

503: The user equipment sends a login request message to the application server, where the login request message includes the login information.

In step 503, the user equipment sends the login request message to the application server.

Optionally, the method 500 further includes step 504: The application server sends the login information to the access management network element, to verify the login information. It may be understood that the application server may directly send the login information to the access management network element, or may indirectly send the login information to the access management network element. That the application server indirectly sends the login information to the access management network element indicates: The application server sends the login information to the access management network element through another device or network element (for example, a NEF network element). For example, the application server sends the login information to the NEF network element, and the NEF network element sends the login information to the access management network element.

According to this embodiment of this application, because transmission of the NAS signaling may not generate to-be-charged traffic, obtaining, through exchange of the NAS signaling between the user and the access management network element, the login information needed for logging in to the application server can implement password-free login, and can also be applied to more scenarios. For example, convenient and secure password-free login can also be performed when mobile network data traffic of the user equipment of a user is switched off.

Optionally, the method 500 further includes: The user equipment sends a NAS registration message to the access management network element. A terminal receives a response to the NAS registration message from the access management network element, where the response to the NAS registration message includes a display identifier. The display identifier may be obtained through exchange of NAS signaling between the user and the access management network element. For the display identifier, refer to the descriptions in the method 300. Details are not described herein again.

Optionally, the method 500 further includes: The access management network element receives a login authentication message from the application server, where the login authentication message includes the login information. The access management network element sends a verification identifier to the application server, where the verification identifier is determined based on the login information. It may be understood that the verification identifier provided by the access management network element to the application server is used by the application server to identify the user. The verification identifier may be the same as or different from a verification identifier received by the user when the user registers with the access management network element through the user equipment.

For example, after receiving the login request of the user, the application server may determine an authentication address (for example, an address of the NEF network element in an operator network) of the login information, and further send the login authentication message to the NEF network element. The NEF network element forwards the login authentication message to the access management network element. In a possible implementation, the login request includes the authentication address of the login information, and the application server may directly obtain the authentication address of the login information based on the login request. It may be understood that the foregoing implementation is an example for description, and this embodiment of this application is not limited thereto. For example, the application server queries the authentication address of the login information based on the login information in the login request.

In a possible implementation, if the access management network element authenticates the login information, the access management network element sends the verification identifier to the application server. In an example, the access management network element determines the verification identifier based on the login information and a correspondence, where the correspondence includes a correspondence between the verification identifier and the login information. For details, refer to the descriptions in the method 300. The details are not described herein again.

It may be understood that the method 500 is an example for description, and embodiments of this application are not limited thereto. For example, the NAS request message in the method 500 may be replaced with a NAS registration message, and the response to the NAS request message may be replaced with a NAS registration accept message. For another example, the NAS request message in the method 500 may be replaced with a NAS message (or a NAS query message), and the response to the NAS request message may be replaced with a response to the NAS message (or a NAS query response message).

For ease of understanding, the following provides descriptions by using an example in which both the display identifier and the verification identifier are a communication number, namely, an MSISDN, the communication network is an IMS network of an operator, and the login information is a token. For differentiation, the MSISDN of the user corresponding to the user equipment is referred to as a target MSISDN, and the login information of the user corresponding to the user equipment is referred to as a target token.

Figure 6A:
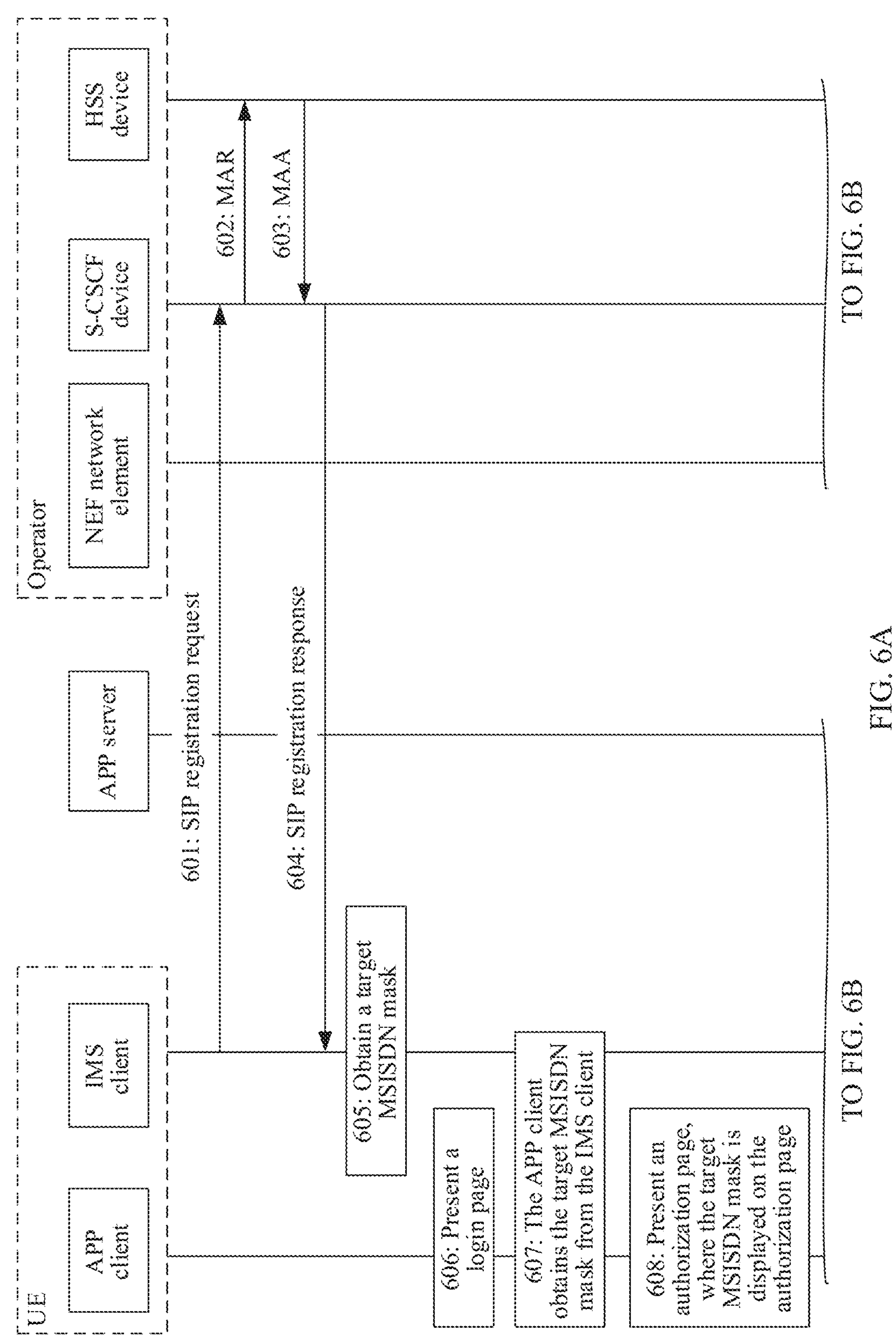
FIG. 6A and FIG. 6B are a schematic flowchart of a communication method 600 according to an embodiment of this application.
Figure 6B:
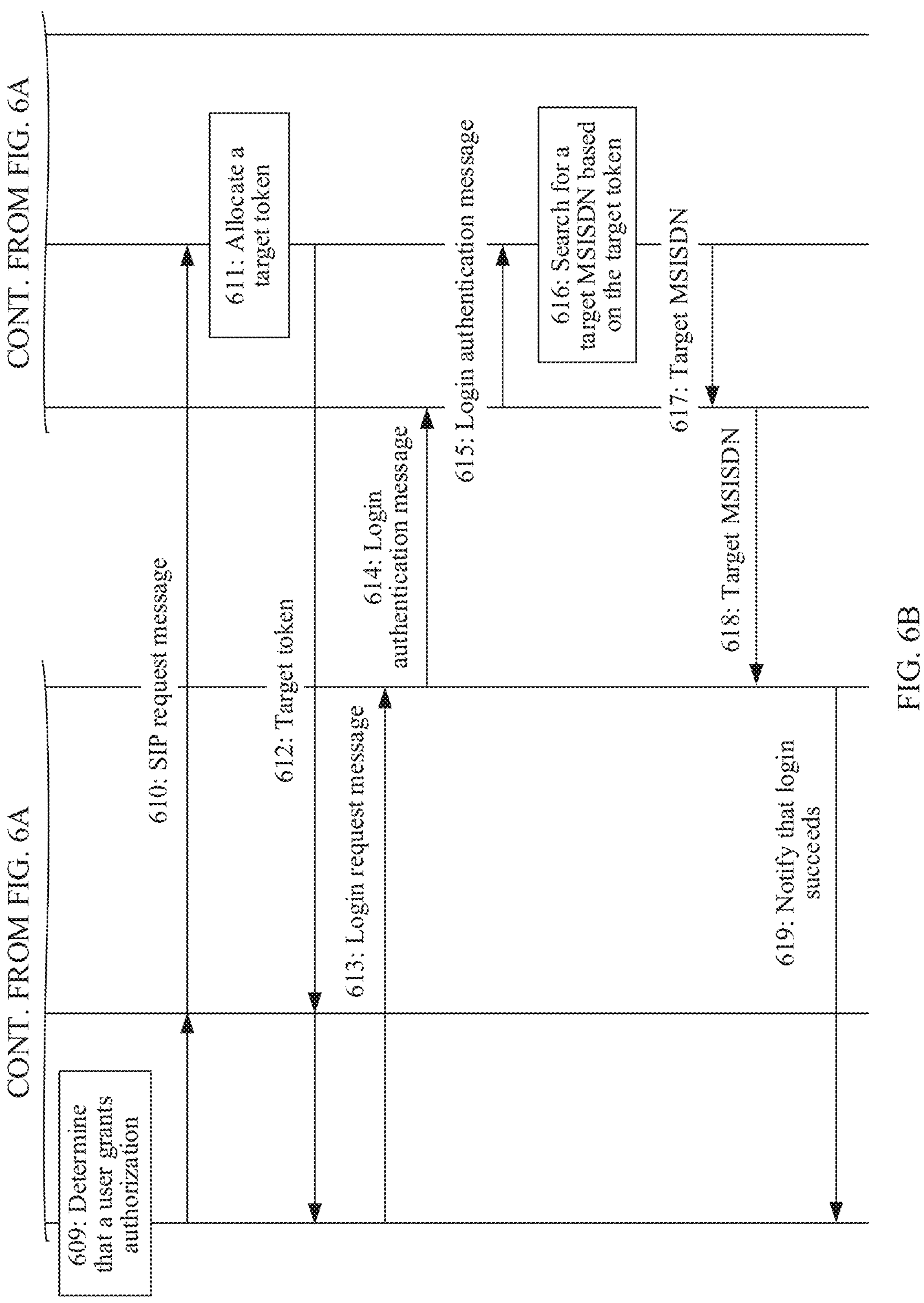

FIG. 6A and FIG. 6B are a schematic flowchart of a communication method 600 according to an embodiment of this application. The method 600 may be applied to implement the solution in the method 300 or the method 400. In the method 600, a core network device is an S-CSCF device. The method 600 may include the following steps.

601: An IMS client (IMS Client) sends a SIP registration (registration) request to the S-CSCF device.

The IMS client is an IMS client in a UE. The IMS client may be installed (or loaded) in a baseband chip of the UE.

In step 601, the IMS client in the UE initiates the SIP registration request to an IMS network of an operator, where the SIP registration request arrives at the S-CSCF device through routing. The SIP registration request indicates performing IMS registration according to a SIP protocol. Optionally, the SIP registration request may further include indication information, and the indication information indicates the S-CSCF device to provide a target token to the user equipment.

602: The S-CSCF device sends a multimedia authorization request (multimedia authorization request, MAR) to an HSS.

After receiving the SIP registration request from the UE, the S-CSCF device may initiate the multimedia authorization request to the HSS to request authentication.

603: The HSS returns a multimedia authorization answer (multimedia authorization answer, MAA) to the S-CSCF device.

Optionally, the MAA includes information related to registration and authentication. In an example, the MAA includes a target MSISDN. The target MSISDN represents an MSISDN of a user (namely, a user of the UE).

604: The S-CSCF device sends a SIP registration response to the IMS client.

The SIP registration response may be considered as a response to the SIP registration request in step 601. Optionally, if the SIP registration request in step 601 may further include the indication information, where the indication information indicates the S-CSCF device to provide the target token to the user equipment, in step 604, the SIP registration response sent by the S-CSCF device to the IMS client may further include the target token. For ease of description, a case in which the SIP registration request in step 601 does not include the foregoing indication information is mainly described in the method 600, in other words, a case in which the user equipment requests the target token by using a SIP request message in step 610 is used as an example for description.

The SIP registration response includes the target MSISDN or a target MSISDN mask. As described above, the MSISDN is a mobile phone number, and the MSISDN mask is a mobile phone number in which a part of digits are hidden. There may be one or more target MSISDNs or target MSISDN masks. For example, if the UE supports dual-SIM dual-standby and has dual SIM cards, there may be two target MSISDNs or two target MSISDN masks.

An existing field in the SIP registration response may be reused or a new field may be added for the target MSISDN or the target MSISDN mask.

In a first possible manner, the SIP registration response includes an associated uniform resource identifier (uniform resource identifier, URI) (P-Associated-URI), where P-Associated-URI includes the target MSISDN or the target MSISDN mask. P-Associated-URI may indicate all associated URIs of a registration address of the UE. It may be understood that the SIP registration response may further include other information. This is not limited. In a possible case, the SIP registration response is a SIP 200 OK response. Using the example in which the SIP registration response is the SIP 200 OK response, a possible form of the SIP registration response is as follows:

SIP/2.0 200 OK

Service-Route: <sip:orig@test1.xxxx.com;1r;ca=ffffffff; TYPE=V4;IP=10.44.174.44;PORT=53064>

P-Associated-URI: <186****5678>//Target MSISDN mask

Path: <sip:term@test2.xxxx.com;1r;ssn;TYPE=V4; IP=10.44.174.44;PORT=53064>

Accept-Resource-Priority: wps.4

Content-Length: 0

In the foregoing example, the SIP 200 OK response may include the target MSISDN mask, and the target MSISDN mask is carried in the "P-Associated-URI" field. Specifically, the target MSISDN mask is 186****5678. It may be understood that the "P-Associated-URI" field may further include other information. This is not limited.

In a second possible manner, a new field, for example, referred to as an "X-MSISDN-Mask" field, is added to the SIP registration response, and the "X-MSISDN-Mask" field includes the target MSISDN or the target MSISDN mask. In a possible case, the SIP registration response is a SIP 200 OK response. Using the example in which the SIP registration response is the SIP 200 OK response, a possible form of the SIP registration response is as follows:

In another possible manner, the IMS client directly obtains the target MSISDN mask.

Specifically, if the SIP registration response sent by the S-CSCF device to the IMS client in step 604 includes the target MSISDN mask, the IMS client may directly obtain the target MSISDN mask. That the SIP registration response includes the target MSISDN mask may be: For example, a header field (for example, referred to as X-MSISDN-Mask) is newly added to the SIP registration response, and a value of the header field is set to the target MSISDN mask. For example, refer to the example of the SIP registration response in step 604. For another example, P-Associated-URI includes the target MSISDN mask. For example, in step 604, the S-CSCF device sends the SIP 200 OK response to the IMS client, where the SIP 200 OK response includes the "P-Associated-URI" field, and the "P-Associated-URI" field includes the target MSISDN mask. The IMS client extracts the target MSISDN mask from the "P-Associated-URI" field in the SIP 200 OK response, and stores the target MSISDN mask.

606: The user equipment presents a login page.

An APP client (APP Client) in the UE presents the login page.

607: The APP client obtains the target MSISDN mask from the IMS client.

In step 605, the IMS client in the UE stores the target MSISDN mask. Therefore, the APP client may obtain the target MSISDN mask from the IMS client.

```
  SIP/2.0 200 OK
  Service-Route:
<sip:orig@test1.xxxx.com;lr;ca=ffffffff;TYPE=V4;IP=10.44.174.44;PORT =53064>
  P-Associated-URI: <sip:+8618612345678@xxxx.com;user=phone>//URI related
to a user identity
  Path: <sip:term@test2.xxxx.com;lr;ssn; TYPE=V4;IP=10.44.174.44;PORT=53064>
  Accept-Resource-Priority: wps.4
  X-MSISDN-Mask: 186****5678//Target MSISDN mask
  Content-Length: 0
```

In the foregoing example, the SIP 200 OK response may include the target MSISDN mask, and the target MSISDN mask is carried in the "X-MSISDN-Mask" field. Specifically, the target MSISDN mask is 186****5678.

605: The IMS client obtains the target MSISDN mask.

Optionally, the IMS client stores the target MSISDN mask.

The IMS client obtains the target MSISDN mask based on the SIP registration response, and stores the target MSISDN mask. The target MSISDN mask may be presented on an authorization page (for example, in step 608). Specifically, details are described below with reference to step 608.

Optionally, the IMS client may obtain the target MSISDN mask in either of the following manners.

In a possible manner, the IMS client generates the target MSISDN mask based on the target MSISDN.

Specifically, if the SIP registration response sent by the S-CSCF device to the IMS client in step 604 includes the target MSISDN, the IMS client may generate the target MSISDN mask based on the target MSISDN.

For example, in step 604, the S-CSCF device sends the SIP 200 OK response to the IMS client, where the SIP 200 OK response includes the "P-Associated-URI" field, and the "P-Associated-URI" field includes the target MSISDN. The IMS client extracts the target MSISDN from the "P-Associated-URI" field in the SIP 200 OK response, generates the target MSISDN mask, and stores the target MSISDN mask.

For example, an operating system of the UE may obtain the MSISDN mask by invoking an interface of the IMS client. Further, the APP client obtains the MSISDN mask by invoking an open interface of the operating system of the UE.

608: The APP client in the UE presents the authorization page, where the target MSISDN mask is displayed on the authorization page.

For example, the APP client pops up the authorization page, and displays (or presents), on the authorization page, the MSISDN mask obtained in step 607. In addition, if there are a plurality of MSISDN masks, the plurality of MSISDN masks may be displayed on the authorization page. For example, if the UE has the dual SIM cards and supports the dual-SIM dual-standby, two MSISDN masks are presented on the authorization page.

Optionally, a service agreement and a login button are further displayed on the authorization page. If there are the plurality of MSISDN masks, and different MSISDN masks correspond to different service agreements, the service agreements corresponding to the plurality of MSISDN masks may be displayed on the authorization page.

A source of the authorization page may be implemented in many manners. This is not limited. The following briefly enumerates two possible manners.

In a possible manner, a software development kit (software development kit, SDK) of the operator is integrated into the APP client, the SDK provides a basic authorization page, and the APP client modifies (or adjusts) the basic authorization page, to obtain the finally presented authorization page.

In another possible manner, the operating system of the UE obtains a basic authorization page from the IMS client, and sends the basic authorization page to the APP client. The APP client modifies (or adjusts) the basic authorization page, to obtain the finally presented authorization page.

In this embodiment of this application, the target MSISDN mask is displayed on the authorization page, so that the user can learn that the user is to perform password-free login by using the number of the user. If the target MSISDN mask is displayed on the authorization page, the user may decide (or determine) whether to log in. If the user decides to log in, the user may perform a subsequent login operation. If the user decides not to log in, the user may reject the login.

Displaying the target MSISDN mask on the authorization page helps improve login experience of the user and security. Specifically, the MSISDN is important data of the user. If the user does not want (or does not agree) to use the MSISDN for the password-free login, it is inappropriate and insecure to present the MSISDN on the authorization page.

609: The APP client determines that the user grants authorization.

That the APP client determines that the user grants authorization, or the APP client learns that the user authorizes to log in indicates: The APP client may determine, based on an operation of the user, that the login can be performed.

For example, the service agreement and the login button are displayed on the authorization page in step 608, and the APP client may determine, based on that the user selects (or ticks, or agrees to) the service agreement and taps the login button, that the user grants the authorization.

610: The APP client sends the SIP request message to the S-CSCF device through the IMS client.

The SIP request message requests the target token. Optionally, the SIP request message indicates the S-CSCF device to provide the target token to the user equipment. For example, the SIP request message may be for triggering the S-CSCF device to provide the target token to the user equipment. For another example, the SIP request message includes indication information, where the indication information indicates the S-CSCF device to provide the target token to the user equipment.

For example, the APP client may invoke the open interface of the operating system of the UE to request the target token. Further, the operating system of the UE may invoke the interface of the IMS client to request the target token, in other words, the IMS client sends the SIP request message to the S-CSCF device, where the SIP request message requests the target token.

A form of the SIP request message may be, for example, a SIP OPTIONS message. Specifically, the IMS client sends the SIP OPTIONS message to the S-CSCF device, where the SIP OPTIONS message requests the target token, and an Accept field in the SIP OPTIONS message may carry: information such as application/login-token. For the SIP request message, there may be the following several manners.

In a first possible manner, the target token is requested by using an existing field in the SIP OPTIONS message. In an example, a form of the SIP OPTIONS message that meets this manner is as follows:

```
OPTIONS sip: test1@xxxx.com
To: <sip:test1@xxxx.com>
From: Alice <sip:test2@xxxx.com>;tag=1928301774
Accept: application/login-token
Content-Length: 0
```

In the foregoing example, the user equipment may indicate, by using the "Accept" field in the SIP OPTIONS message and the value "application/login-token" of the "Accept" field, the S-CSCF device to provide the target token to the user equipment. Alternatively, the user equipment indicates, by using the "Accept" field and the value "application/login-token" of the "Accept" field, the S-CSCF device to provide data of an "application/login-token" type to the user equipment. The data of the "application/login-token" type may indicate information (for example, the target token) needed for logging in to an application.

In a second possible manner, the target token is requested by using a parameter in a start line (or a request line) of the SIP OPTIONS message. In an example, a form of the SIP OPTIONS message that meets this manner is as follows:

```
OPTIONS sip: test1@huawei.com;type=login-token SIP/2.0
To: <sip:test1@huawei.com>
From: Alice <sip:test2@huawei.com>;tag=1928301774
Accept: application/json
Content-Length: 0
```

In the foregoing example, the user equipment may indicate, by using the parameter "type=login-token" newly added to the start line of the SIP OPTIONS message, the S-CSCF device to provide the target token to the user equipment. Alternatively, the user equipment indicates, by using the parameter "type=login-token", the S-CSCF device to provide data of a "login-token" type to the user equipment. The data of the "login-token" type may indicate information (for example, the target token) needed for logging in to an application.

It may be understood that the foregoing is an example for description, and no limitations are imposed. For example, "application/json" may alternatively be another type, for example, "application/text".

In a third possible manner, the target token is requested by using another message (for example, a SIP GET message). In an example, a form of the SIP GET message is as follows:

```
GET sip: test1@huawei.com;type=login-token SIP/2.0
To: <sip:test1@huawei.com>
From: Alice <sip:test2@huawei.com>;tag=1928301774
Accept: application/json
Content-Length: 0
```

In the foregoing example, the user equipment may indicate, by using the parameter "type=login-token" in a start line (or a request line) of the SIP GET message, the S-CSCF device to provide the target token to the user equipment. Alternatively, the user equipment indicates, by using the parameter "type=login-token", the S-CSCF device to provide data of a "login-token" type to the user equipment. The data of the "login-token" type may indicate information (for example, the target token) needed for logging in to an application.

611: The S-CSCF device allocates the target token.

The S-CSCF device may first determine the target MSISDN, and then allocate the target token. For example, the S-CSCF device determines the target MSISDN of the user based on information in the SIP request message (for example, information in the “From” field in the SIP OPTIONS message), further generates the token, and allocates the token to the target MSISDN, to complete an operation of allocating the target token. For descriptions of the token, refer to the related descriptions of the login information in the method 300. Details are not described herein again.

In a possible case, the S-CSCF device stores (or maintains) a correspondence between the target token and the target MSISDN, for example, in the form of Table 1.

In another possible case, the S-CSCF device may send a correspondence between the target token and the target MSISDN to another network element (for example, a UDM network element), and the another network element stores the correspondence, for example, in the form of Table 1.

612: The S-CSCF device sends the target token to the APP client through the IMS client.

Optionally, the S-CSCF device sends an authentication address of the target token to the APP client through the IMS client. The target token and the authentication address of the target token may be carried in same signaling, or may be carried in different signaling. This is not limited.

For example, the S-CSCF device returns a SIP response message to the IMS client, where the SIP response message includes the target token and the authentication address of the target token. The operating system of the UE returns, to the APP client, the target token and the authentication address of the target token that are obtained by the IMS client.

A method for returning the SIP response message by the S-CSCF device to the IMS client and a field name of the SIP response are not limited. For example, the SIP response message is a SIP 200 OK response. For example, the S-CSCF device returns the SIP 200 OK response to the IMS client, where an “X-Login-Token” field in the SIP 200 OK response carries the target token, and an “X-Token-Auth-Addr” field in the SIP 200 OK response carries the authentication address of the target token.

Using the first possible manner in step 610 as an example, in an example, a form of the SIP 200 OK response is as follows:

```
SIP/2.0 200 OK
To: <sip:test1@xxxx.com>;tag=93810874
From: Alice <sip:test2@xxxx.com>;tag=1928301774
Accept: application/login-token
X-Login-Token: eyJhbGciOiJIUzI1NiIsInR5cCI6IkpXVCJ9.eyJkYXRhIjpbeyJ0b29sdHQ
   iOiJodHRwczovL3Rvb2x0dC5jb20ifV0sImlhdCI6MTY0ODA4NTQ2NswiZXhwIjox
   NjQ4MTM3NTk5LCJhdWQiOiJBbGljZSIsImlzcyI6InRlc3QiLCJzdWIiOiJsb2dpbiJ9.
   LrLUGSaNeepmq0EfPplLxN_o3cJQm3D_oV_11t_DTmQ//Login information
X-Token-Auth-Addr: https://test3.xxx.com/verification//Authentication address
Content-Length: 0
```

It may be understood that the login information carried in the “X-Login-Token” field may be encoded information. For example, the S-CSCF device encodes, in a Base64 encoding mode, at least one of the following information: information about the user equipment, information about the user corresponding to the user equipment, the authentication address of the target token, an application scope of the target token, a validity period of the target token, or verification information for the target token. The encoded target token is shown in the foregoing example. It may be understood that whether to perform encoding and a coding mode used during the encoding are not limited in embodiments of this application.

Using the second possible manner in step 610 as an example, in an example, a form of the SIP 200 OK response is as follows:

```
SIP/2.0 200 OK
To: <sip:test1@xxxx.com>;tag=93810874
From: Alice <sip:test2@xxxx.com>;tag=1928301774
Content-Code: application/json
Content-Length: 314
{
“token”: “eyJhbGciOiJIUzI1NiIsInR5cCI6IkpXVCJ9.eyJkYXRhIjpbeyJ0b29
   sdHQiOiJodHRwczovL3Rvb2x0dC5jb20ifV0sImlhdCI6MTY0ODA4NTQ
   2NSwiZXhwIjoxNjQ4MTM3NTk5LCJhdWQiOiJBbGljZSIsImlzcyI6InRl
   c3QiLCJzdWIiOiJsb2dpbiJ9.LrLUGSaNeepmq0EfPplLxN_o3cJQm3D_o
   V_11t_DTmQ”,//Login information
“auth_addr”: https://test3.xxx.com/verification//Authentication address
}
```

The authentication address of the target login is https://test3.xxx.com/verification.

In an example, steps 601 to 612 above may be considered as preparations performed before the login, and steps 613 to 619 below may be considered as the login and login authentication.

613: The APP client sends a login request message to an application server.

The login request message includes the target token. Optionally, the login request message further includes the authentication address of the target token.

614: The application server sends a login authentication message to a NEF network element.

The login authentication message includes the target token, and requests a verification identifier. The verification identifier one-to-one corresponds to the user, and may identify the user. In other words, the user may be identified based on the verification identifier. In an example, the verification identifier is the target MSISDN. The following mainly uses the target MSISDN as an example for description.

After receiving the login request, the application server may determine the authentication address (for example, an address of the NEF network element in an operator network) of the target token, and further send the login authentication message to the NEF network element.

In a possible implementation, the login request includes the authentication address of the target token, and the application server may directly obtain the authentication address of the target token based on the login request. It may be understood that the foregoing implementation is an example for description, and this embodiment of this application is not limited thereto. For example, the application server queries the authentication address of the target token based on the target token in the login request.

Optionally, the login authentication message may further carry an APP ID. For example, the application server obtains the APP ID in advance. For example, the application server may request the APP ID from the operator network. When sending the login authentication message to the NEF network element, the application server includes the APP ID obtained in advance in the login authentication message, so that the operator network can identify the application server.

Optionally, the login authentication message may be encrypted and/or protected against tampering. In a possible implementation, the login authentication message may be encrypted by using an APP key (key). For example, the application server obtains the APP key in advance. For example, the application server may request the APP key from the operator network. When the application server sends the login authentication message to the NEF network element, the login authentication message may be encrypted by using the APP key, to improve the security.

615: The NEF network element forwards the login authentication message to the S-CSCF device.

Optionally, that the NEF network element forwards the login authentication message to the S-CSCF device includes: If the NEF network element authenticates the login authentication message, the NEF network element forwards the login authentication message to the S-CSCF device.

For example, the login authentication message sent by the application server to the NEF network element includes the target token and the APP ID, and the login authentication message is encrypted by using the APP key. The NEF network element verifies the login authentication message by using an APP key corresponding to the APP ID. After the verification succeeds, the NEF network element forwards the login authentication message to the S-CSCF device.

616: The S-CSCF device searches for the target MSISDN based on the target token.

In a possible case, if the S-CSCF device locally stores the correspondence between the target token and the target MSISDN, the S-CSCF device searches, based on the correspondence, for the target MSISDN corresponding to the target token. Table 1 is used as an example. If a target token included in a request message #1 is the token #1, the S-CSCF device determines that a target MSISDN corresponding to the target token is an MSISDN #1.

In another possible case, if the another network element stores the correspondence between the target token and the target MSISDN, the S-CSCF device may request, from the another network element, the target MSISDN corresponding to the target token.

Optionally, that the S-CSCF device searches for the target MSISDN based on the target token includes: If the S-CSCF device authenticates the target token (or the S-CSCF device successfully verifies the target token), the S-CSCF device searches for the target MSISDN based on the target token.

That the S-CSCF device performs authentication on (or verifies) the target token means: The S-CSCF device verifies validity of the target token. In an example, that the S-CSCF device verifies the target token may include, for example, at least one of the following: The S-CSCF device verifies whether the target token has expired, or the S-CSCF device verifies whether the S-CSCF device is to verify the target token. For example, if the target token has not expired, it may be considered that the verification succeeds; or if the target token has expired, it may be considered that the verification fails. For another example, if the S-CSCF device determines that the S-CSCF device is to verify the target token, it may be considered that the verification succeeds; or if the S-CSCF device determines that the S-CSCF device has no permission to verify the target token, it may be considered that the verification fails. For example, using the example in step 612 as an example, after receiving the target token (namely, the login information), the S-CSCF device may first perform decoding to obtain at least one of the foregoing information in the target token, and then verify the at least one of the foregoing information. For another example, after receiving the target token (namely, the login information) that carries a digital signature, the S-CSCF device may first verify the digital signature based on a key of the S-CSCF device. If the verification succeeds, the S-CSCF device may perform decoding to obtain at least one of the foregoing information in the target token, and then verify the at least one of the foregoing information. For details, refer to the related descriptions in the method 300. The details are not described herein again.

617: The S-CSCF device sends the target MSISDN to the NEF network element.

For example, after finding the target MSISDN, the S-CSCF device sends a response to the login authentication message to the NEF network element, where the response carries the target MSISDN.

618: The NEF network element sends the target MSISDN to the application server.

For example, after receiving the response to the login authentication message from the S-CSCF device, the NEF network element forwards the response to the login authentication message to the application server.

619: The application server notifies the APP client that the login succeeds.

The user may implement the password-free login through the preceding steps.

Optionally, the S-CSCF device processes the target token. In an example, the S-CSCF device may perform, on the target token, at least one of the following processing: The S-CSCF device records (for example, for charging) a quantity of times that the APP ID successfully obtains the target MSISDN by using the target token, or the S-CSCF device marks the target token as invalid.

It may be understood that an example in which the target token is requested by using the SIP request message is mainly used in the embodiment shown in FIG. 6A and FIG. 6B for description, and no limitations are imposed. For example, the user equipment may alternatively obtain the target token by using the SIP registration request, and the SIP registration response sent by the S-CSCF device to the IMS client carries the target token.

With reference to steps 601 to 619 shown in FIG. 6A and FIG. 6B, the foregoing describes an example of a scenario in which the login is completed by using SIP signaling between the UE and the IMS network of the operator. According to the foregoing embodiment, the password-free login can be implemented through the IMS network of the operator and by using the SIP signaling, and password-free login in more scenarios can be supported without relying on mobile network data traffic. In addition, the user can complete the password-free login in the foregoing login mode in a short period of time (for example, within one to two seconds), and user experience is good. In addition, in some steps, authentication may be performed between the UE and the IMS network of the operator by using an authentication and key agreement (authentication and key agreement, AKA) method, so that the security is high.

Figure 7A:
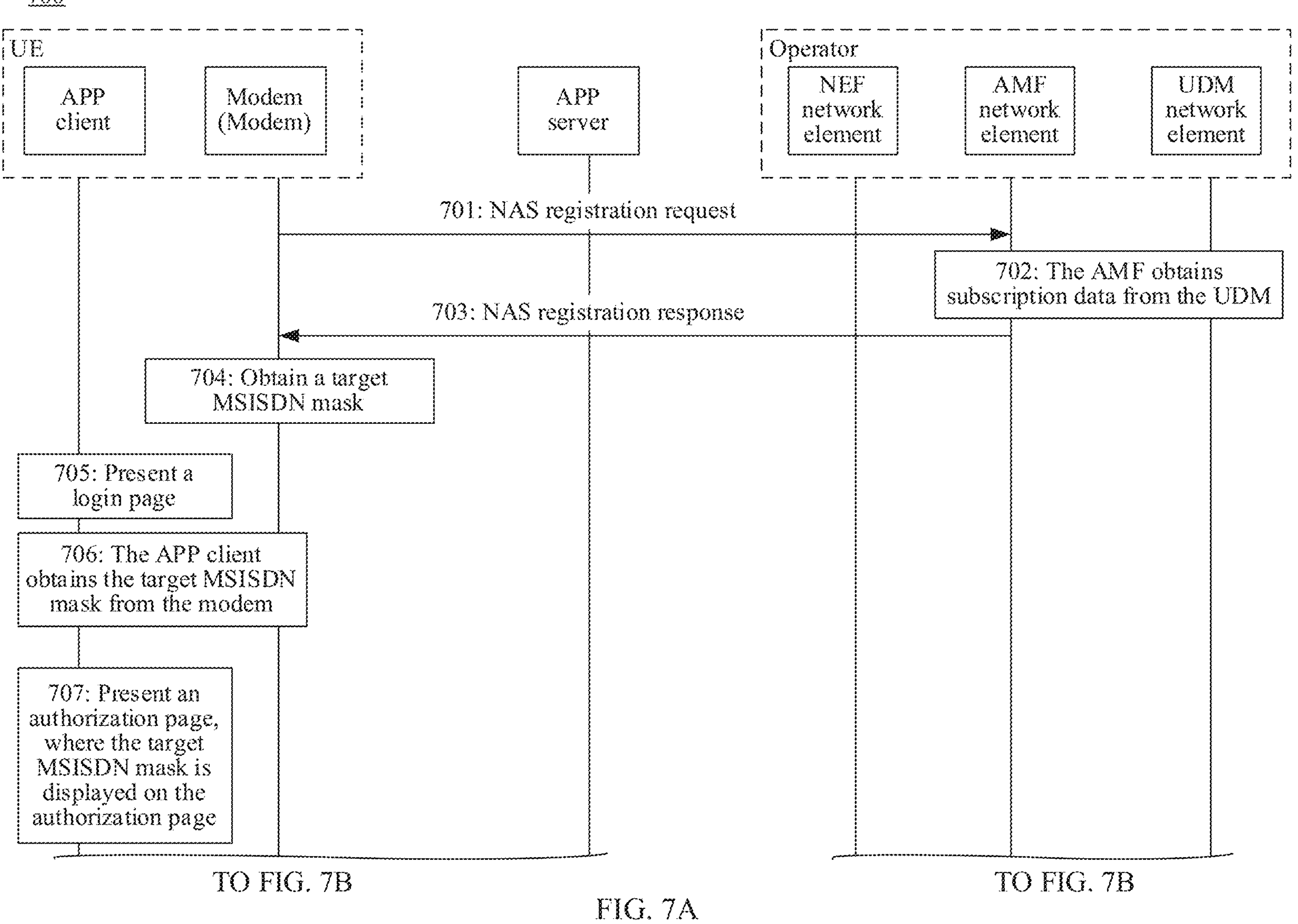
FIG. 7A and FIG. 7B are a schematic flowchart of a communication method 700 according to an embodiment of this application.
Figure 7B:
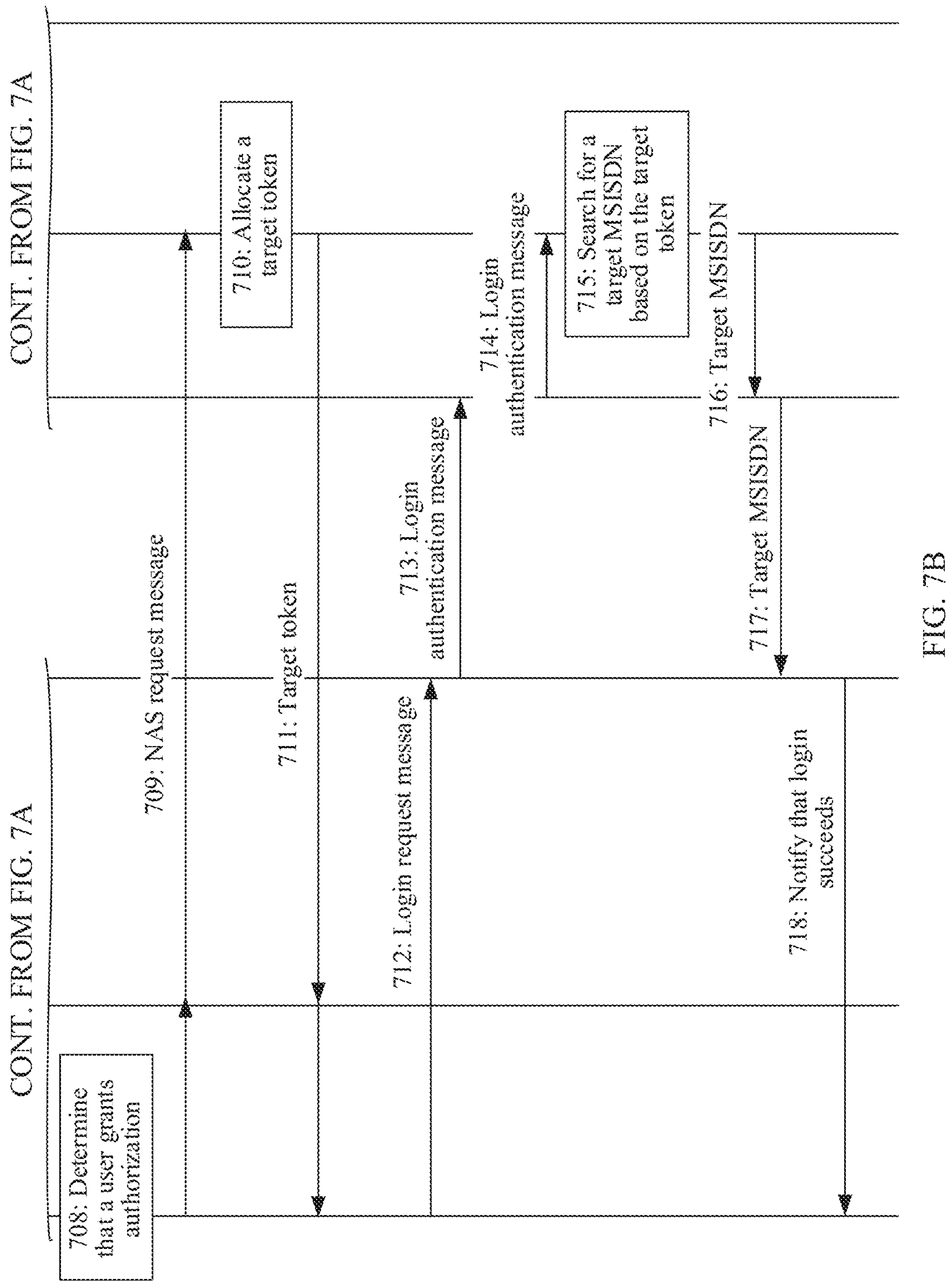

FIG. 7A and FIG. 7B are a schematic flowchart of a communication method 700 according to an embodiment of this application. The method 700 may be applied to implement the solution in the method 300 or the method 500. In the method 700, a core network device may include an AMF network element. The method 700 may include the following steps.

701. A modem (Modem) sends a NAS registration (registration) request to the AMF network element.

The modem is a modem in a UE. The modem may be installed (or loaded) in a baseband chip of the UE.

In step 701, the modem in the UE initiates the NAS registration request to an operator network, where the request arrives at the AMF network element through routing. Optionally, the NAS registration request may further include indication information, and the indication information indicates the AMF network element to provide a target token to the user equipment.

702: The AMF network element obtains subscription data from a UDM network element.

After receiving the NAS registration request of the UE, the AMF network element may initiate registration to the UDM network element, and obtain the subscription data of the UE.

The subscription data includes a target MSISDN.

703: The AMF network element returns a NAS registration response to the modem.

The NAS registration response may be considered as a response to the NAS registration request in step 701. In an example, the NAS registration response is a registration accept (registration accept) response. Optionally, if the NAS registration request in step 701 may further include the indication information, where the indication information indicates the AMF network element to provide the target token to the user equipment, in step 703, the NAS registration response sent by the AMF network element to an IMS client may further include the target token. For ease of description, a case in which the NAS registration request in step 701 does not include the foregoing indication information is mainly described in the method 700, in other words, a case in which the user equipment requests the target token by using a NAS request message in step 709 is used as an example for description.

The NAS registration response includes the target MSISDN or a target MSISDN mask. As described above, the MSISDN is a mobile phone number, and the MSISDN mask is a mobile phone number in which a part of digits are hidden. There may be one or more target MSISDNs or target MSISDN masks. For example, if the UE supports dual-SIM dual-standby and has dual SIM cards, there may be two target MSISDNs or two target MSISDN masks.

In a possible case, a form of the NAS registration response is as follows:

```
registrationAccept
  nGS-registration-result
    spare: 0x0
    sms-allowed-flag: sms-over-NAS-not-allowed
    ngs-registration-result-value: the-3GPP-access
  ng-GUTI
    ...
  tai-list
    ...
  ...
  am-data
    msisdn-mask: 186****5678//Target MSISDN mask
```

In the foregoing example, the NAS registration response may include the target MSISDN mask, and the target MSISDN mask is 186****5678.

In another possible case, a form of the NAS registration response is as follows:

```
registrationAccept
  nGS-registration-result
    spare: 0x0
    sms-allowed-flag: sms-over-NAS-not-allowed
    ngs-registration-result-value: the-3GPP-access
  ng-GUTI
    ...
  tai-list
    ...
  ...
  am-data
    msisdn: 18612345678//Target MSISDN
```

In the foregoing example, the NAS registration response may include the target MSISDN, namely, 18612345678, and the user equipment may generate the target MSISDN mask after receiving the target MSISDN.

704: The modem obtains the target MSISDN mask.

Optionally, the modem stores the target MSISDN mask.

For example, the modem obtains the target MSISDN mask based on the NAS registration response, and stores the target MSISDN mask. The target MSISDN mask may be presented on an authorization page (for example, in step 707). Specifically, details are described below with reference to step 707.

Optionally, the modem may obtain the target MSISDN mask in either of the following manners.

In a possible manner, the modem generates the target MSISDN mask based on the target MSISDN.

Specifically, if the NAS registration response sent by the AMF network element to the modem in step 703 includes the target MSISDN, the modem may generate the target MSISDN mask based on the target MSISDN.

In another possible manner, the modem directly obtains the target MSISDN mask.

Specifically, if the NAS registration response sent by the AMF network element to the modem in step 703 includes the target MSISDN mask, the modem may directly obtain the target MSISDN mask. The NAS registration response includes the target MSISDN mask.

705: The user equipment presents a login page.

An APP client in the UE presents the login page.

706: The APP client obtains the target MSISDN mask from the modem.

In step 704, the modem in the UE stores the target MSISDN mask. Therefore, the APP client may obtain the target MSISDN mask from the modem. For example, an operating system of the UE may obtain the MSISDN mask by invoking an interface of the modem. Further, the APP client obtains the MSISDN mask by invoking an open interface of the operating system of the UE.

707: The APP client in the UE presents the authorization page, where the target MSISDN mask is displayed on the authorization page.

A source of the authorization page may be implemented in many manners. This is not limited. The following briefly enumerates two possible manners.

In a possible manner, an SDK of an operator is integrated into the APP client, the SDK provides a basic authorization page, and the APP client modifies (or adjusts) the basic authorization page, to obtain the finally presented authorization page.

In another possible manner, the operating system of the UE obtains a basic authorization page from the modem, and sends the basic authorization page to the APP client. The APP client modifies (or adjusts) the basic authorization page, to obtain the finally presented authorization page.

Step 707 is similar to step 608, and details are not described herein again.

708: The APP client determines that a user grants authorization.

Step 708 is similar to step 609, and details are not described herein again.

709: The APP client sends the NAS request message to the AMF network element through the modem.

The NAS request message requests the target token. Optionally, the NAS request message indicates the AMF network element to provide the target token to the user equipment. For example, the NAS request message may be for triggering the AMF network element to provide the target token to the user equipment. For another example, the NAS request message includes indication information, where the indication information indicates the AMF network element to provide the target token to the user equipment.

For example, the APP client may invoke the open interface of the operating system of the UE to request the target token. Further, the operating system of the UE may invoke the interface of the modem to request the target token, in other words, the modem sends the NAS request message to the AMF network element, where the NAS request message requests the target token.

A form of the NAS request message may be, for example, an uplink NAS transport (UL NAS transport) request.

In an example, a possible form of the NAS request message is as follows:

```
loginTokenRequest
  ...
  ng-guti
    type-of-identity: ng-guti
    ...
    ng-guti-body
      mcc-mnc: 0x64f030
      amf-region-id: 0x0
```

-continued

```
      amf-set-id-h: 0x0
      amf-pointer: 0x1
      amf-set-id-1: 0x0
      ng-tmsi: 0x79
  ...
```

710: The AMF network element allocates the target token.

The AMF network element may first determine the target MSISDN, further generate the target token, and then allocate the target token to the target MSISDN. In this way, an operation of allocating the target token is completed. For example, the AMF network element determines the user based on information in the NAS request message, and may further determine the target MSISDN of the user and allocate the token. The AMF network element determines the user in many manners. This is not limited. For example, the AMF network element may identify the user based on a globally unique temporary UE identity (globally unique temporary UE identity, GUTI) in the NAS request message, for example, determine the user based on ng-guti-body in the foregoing NAS request message.

In a possible case, the AMF network element stores (or maintains) a correspondence between the target token and the target MSISDN, for example, in the form of Table 1.

In another possible case, the AMF network element may send a correspondence between the target token and the target MSISDN to another network element (for example, the UDM network element), and the another network element stores the correspondence, for example, in the form of Table 1.

711: The AMF network element sends the target token to the APP client through the modem.

Optionally, the AMF network element sends an authentication address of the target token to the APP client through the modem. The target token and the authentication address of the target token may be carried in same signaling, or may be carried in different signaling. This is not limited.

For example, the AMF network element returns a NAS response message to the modem, where the NAS response message includes the target token and the authentication address of the target token. The operating system of the UE returns, to the APP client, the target token and the authentication address of the target token that are obtained by the modem. The NAS response message may be, for example, a downlink NAS transport (DL NAS transport) response.

In an example, a possible form of the NAS response message is as follows:

```
loginTokenResponse
  ...
  login-token: eyJhbGciOiJIUzI1NiIsInR5cCI6IkpXVCJ9.eyJkYXRhIjpbeyJ0b29
    sdHQiOiJodHRwczovL3Rvb2x0dC5jb20ifV0sImlhdCI6MTY0ODA4NTQ
    2NSwiZXhwIjoxNjQ4MTM3NTk5LCJhdWQiOiJBbGljZSIsImlzcyI6InR1
    c3QiLCJzdWIiOiJsb2dpbiJ9.LrLUGSaNeepmq0EfPplLxN__o3cJQm3D__o
    V__11t__DTmQ//Login information
  token-auth-addr: https://test.xxx.com/verification//Authentication address
  ...
```

It may be understood that the login information carried in the "login-token" field may be encoded information. For example, the AMF network element encodes, in a Base64 encoding mode, at least one of the following information: information about the user equipment, information about the user corresponding to the user equipment, the authentication address of the target token, an application scope of the target token, a validity period of the target token, or verification information for the target token. The encoded target token is shown in the foregoing example. It may be understood that whether to perform encoding and a coding mode used during the encoding are not limited in embodiments of this application.

In an example, steps 701 to 711 above may be considered as preparations performed before the login, and steps 712 to 718 below may be considered as the login and login authentication.

712: The APP client sends a login request message to the application server.

The login request message includes the target token. Optionally, the login request message further includes the authentication address of the target token.

713: The application server sends a login authentication message to a NEF network element.

Step 713 is similar to step 614, and details are not described herein again.

714: The NEF network element forwards the login authentication message to the AMF network element.

Optionally, that the NEF network element forwards the login authentication message to the AMF network element includes: If the NEF network element authenticates the login authentication message, the NEF network element forwards the login authentication message to the AMF network element.

For example, the login authentication message sent by the application server to the NEF network element includes the target token and an APP ID, and the login authentication message is encrypted by using an APP key. The NEF network element verifies the login authentication message by using an APP key corresponding to the APP ID. After the verification succeeds, the NEF network element forwards the login authentication message to the AMF network element.

715: The AMF network element searches for the target MSISDN based on the target token.

In a possible case, if the AMF network element locally stores the correspondence between the target token and the target MSISDN, the AMF network element searches, based on the correspondence, for the target MSISDN corresponding to the target token. Table 1 is used as an example. If the target token included in the login authentication message is the token #2, the AMF network element determines that the target MSISDN corresponding to the target token is an MSISDN #2.

In another possible case, if the another network element (for example, the UDM network element) stores the correspondence between the target token and the target MSISDN, the AMF network element may request, from the another network element, the target MSISDN corresponding to the target token.

Optionally, that the AMF network element searches for the target MSISDN based on the target token includes: If the AMF network element authenticates the target token (or the AMF network element successfully verifies the target token), the AMF network element searches for the target MSISDN based on the target token.

That the AMF network element performs authentication on (or verifies) the target token means: The AMF network element verifies validity of the target token. In an example, that the AMF network element verifies the target token may include, for example, at least one of the following: The AMF network element verifies whether the target token has expired, or the AMF network element verifies whether the AMF network element is to verify the target token. For example, if the target token has not expired, it may be considered that the verification succeeds; or if the target token has expired, it may be considered that the verification fails. For another example, if the AMF network element determines that the AMF network element is to verify the target token, it may be considered that the verification succeeds; or if the AMF network element determines that the AMF network element has no permission to verify the target token, it may be considered that the verification fails. For example, using the example in step 711 as an example, after receiving the target token (namely, the login information), the AMF network element may first perform decoding to obtain at least one of the foregoing information in the target token, and then verify the at least one of the foregoing information. For another example, after receiving the target token (namely, the login information) that carries a digital signature, the AMF network element may first verify the digital signature based on a key of the AMF network element. If the verification succeeds, the AMF network element may perform decoding to obtain at least one of the foregoing information in the target token, and then verify the at least one of the foregoing information. For details, refer to the related descriptions in the method 300. The details are not described herein again.

716: The AMF network element sends the target MSISDN to the NEF network element.

For example, after finding the target MSISDN, the AMF network element sends a response to the login authentication message to the NEF network element, where the response carries the target MSISDN.

717: The NEF network element sends the target MSISDN to the application server.

For example, after receiving the response to the login authentication message from the AMF network element, the NEF network element forwards the response to the login authentication message to the application server.

718: The application server notifies the APP client that the login succeeds.

The user may implement password-free login through the preceding steps.

Optionally, the AMF network element processes the target token. In an example, the AMF network element may perform, on the target token, at least one of the following processing: The AMF network element records (for example, for charging) a quantity of times that the APP ID successfully obtains the target MSISDN by using the target token, or the AMF network element marks the target token as invalid.

It may be understood that an example in which the target token is requested by using the NAS request message is mainly used in the embodiment shown in FIG. 7A and FIG. 7B for description, and no limitations are imposed. For example, the user equipment may alternatively obtain the target token by using the NAS registration request, and the NAS registration response sent by the AMF network element to the IMS client carries the target token.

With reference to steps 701 to 718 shown in FIG. 7A and FIG. 7B, the foregoing describes an example of a scenario in which the login is completed by using NAS signaling between the UE and a core network. According to the foregoing embodiment, the password-free login can be implemented through the core network and by using the NAS signaling, and password-free login in more scenarios can be supported without relying on mobile network data traffic. In addition, the user can complete the password-free login in the foregoing login mode in a short period of time (for example, within one to two seconds), and user experience is good. In addition, in some steps, authentication may be performed between the UE and the core network by using an AKA method, so that security is high.

It may be understood that the examples in FIG. 6A and FIG. 6B and in FIG. 7A and FIG. 7B in embodiments of this application are merely intended to help a person skilled in the art understand embodiments of this application, but are not intended to limit embodiments of this application to specific scenarios in the examples. A person skilled in the art may definitely make various equivalent modifications or changes according to the examples shown in FIG. 6A and FIG. 6B and in FIG. 7A and FIG. 7B, and such modifications or changes also fall within the scope of embodiments of this application. For example, the network elements or devices in FIG. 6A and FIG. 6B and in FIG. 7A and FIG. 7B may be replaced with other network elements or devices that can perform the foregoing functions. For another example, if the target token is requested by using the SIP registration request message in the method 600, the SIP registration request in step 601 may further include the indication information, where the indication information indicates the S-CSCF device to provide the target token to the user equipment. After receiving the SIP registration request, the S-CSCF device allocates the target token based on the indication information in the SIP registration request (for example, refer to step 611). In step 604, the SIP registration response sent by the S-CSCF device to the IMS client may further include the target token. In this case, the method 600 may not include steps 610 and 612. For another example, if the target token is requested by using the NAS registration request message in the method 700, the NAS registration request in step 701 may further include the indication information, where the indication information indicates the AMF network element to provide the target token to the user equipment. After receiving the NAS registration request, the AMF network element allocates the target token based on the indication information in the NAS registration request (for example, refer to step 710). In step 703, the NAS registration response sent by the AMF network element to the modem may further include the target token. In this case, the method 700 may not include steps 709 and 711.

It may be further understood that the steps in FIG. 6A and FIG. 6B and in FIG. 7A and FIG. 7B are merely examples for description, and no strict limitations are imposed. In addition, sequence numbers of the foregoing processes do not mean a sequence of execution. The sequence of execution of the processes should be determined according to functions and internal logic of the processes, and should not constitute any limitation on an implementation process of embodiments of this application.

It may be further understood that, in some of the foregoing embodiments, the example in which the display identifier and the verification identifier are the communication number of the user is mainly used for description, and no limitations are imposed. For example, the verification identifier may be replaced with any other identifier that can identify the user. For another example, the display identifier may be replaced with the nickname of the user or the like. In addition, the verification identifier may be replaced with the third identifier. The display identifier may be replaced with the first identifier or the second identifier.

It may be further understood that in some of the foregoing embodiments, the IMS client or the modem is mainly used as an example for description, and the IMS client or the modem may alternatively be replaced with a mobile operating system (mobile OS).

It may be further understood that some message names in embodiments of this application do not limit the protection scope of embodiments of this application.

It may be further understood that a possible form of a message (for example, the SIP message or the NAS message) is mentioned in some of the foregoing embodiments. It may be understood that the foregoing is merely an example for description, and no limitations are imposed. Any variation of the foregoing message is applicable to embodiments of this application.

It may be further understood that some optional features in embodiments of this application may be independent of other features in some scenarios, or may be combined with other features in some scenarios. This is not limited.

It may be further understood that various numeric sequence numbers in embodiments of this application do not mean execution sequences, but are merely for differentiation for ease of description, and therefore should not constitute any limitation on an implementation process of embodiments of this application.

It may be further understood that, in the foregoing method embodiments, the method and the operation implemented by the device may alternatively be implemented by a component (for example, a chip or a circuit) of the device. This is not limited.

Embodiments of this application further provide apparatuses corresponding to the methods provided in the foregoing method embodiments. The apparatus includes a corresponding module configured to perform the foregoing method embodiments. The module may be software, hardware, or a combination of software and hardware. It may be understood that the technical features described in the foregoing method embodiments are also applicable to the following apparatus embodiments.

Figures 8, 9:
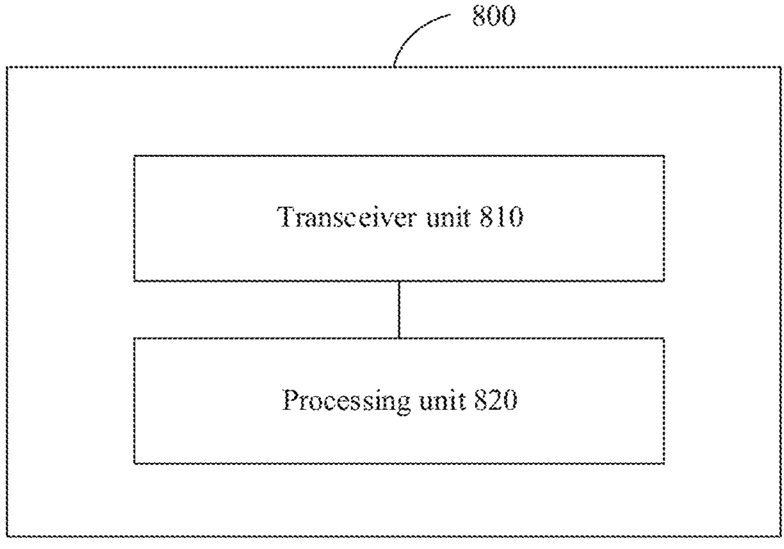
FIG. 8 is a diagram of a communication apparatus 800 according to an embodiment of this application.
FIG. 9 is a diagram of another communication apparatus 900 according to an embodiment of this application.

FIG. 8 is a diagram of a communication apparatus 800 according to an embodiment of this application. The apparatus 800 includes a transceiver unit 810 and a processing unit 820. The transceiver unit 810 may be configured to implement a corresponding communication function. The transceiver unit 810 may also be referred to as a communication interface or a communication unit. The processing unit 820 may be configured to perform a processing operation, for example, allocate a token or verify a token.

Optionally, the apparatus 800 further includes a storage unit. The storage unit may be configured to store instructions and/or data. The processing unit 820 may read the instructions and/or the data in the storage unit, so that the apparatus implements an action of the core network device or the user equipment in the foregoing method embodiments.

In a first design, the apparatus 800 may be the user equipment in the foregoing embodiments, or may be a component (for example, a chip) of the user equipment. The apparatus 800 may implement the steps or procedures performed by the user equipment in the foregoing method embodiments. The transceiver unit 810 may be configured to perform a transceiver-related operation of the user equipment (for example, an operation of sending and/or receiving data or a message) in the foregoing method embodiments. For example, the transceiver unit 810 may be configured to perform the operation of sending the first uncharged traffic message to the core network device in step 301, the operation of receiving the second uncharged traffic message from the core network device in step 302, and the operation of sending the login information to the application server in step 303 in FIG. 3; may be further configured to perform the operation of sending the SIP request message to the call session control function device in step 401, the operation of receiving the response to the SIP request message from the call session control function device in step 402, and the operation of sending the login request message to the application server in step 403 in FIG. 4; may be further configured to perform the operation of sending the NAS request message to the access management network element in step 501, the operation of receiving the response to the NAS request message from the access management network element in step 502, and the operation of sending the login request message to the application server in step 503 in FIG. 5; and may be further configured to perform an operation of sending and/or receiving data or a message by the UE in FIG. 6A and FIG. 6B and in FIG. 7A and FIG. 7B. The processing unit 820 may be configured to perform a processing-related operation of the user equipment in the foregoing method embodiments or an operation other than sending and receiving (for example, an operation other than sending and/or receiving data or a message). For example, the processing unit 820 may be configured to generate the first uncharged traffic message. For another example, the processing unit 820 may be configured to perform the operations in steps 606 to 609 in FIG. 6A and FIG. 6B, and perform the operations in steps 705 to 708 in FIG. 7A and FIG. 7B.

In a possible implementation, the transceiver unit 810 is configured to send a first uncharged traffic message to a core network device, where the first uncharged traffic message is for triggering the core network device to send a second uncharged traffic message to the user equipment. The transceiver unit 810 is further configured to receive a second uncharged traffic message from the core network device, where the second uncharged traffic message includes login information, and the login information is information needed by the user equipment to log in to an application server. The transceiver unit 810 is further configured to send the login information to the application server, to log in to the application server. Both the first uncharged traffic message and the second uncharged traffic message are messages that are transmitted via a base station without generating to-be-charged traffic. Optionally, the processing unit 820 is configured to process the second uncharged traffic message, to obtain the login information. Optionally, the processing unit 820 is configured to generate the first uncharged traffic message.

For example, the first uncharged traffic message indicates the core network device to provide the login information to the user equipment.

Optionally, the processing unit 820 is configured to obtain and display first identification information, or obtain and display, by the user equipment, second identification information, where the first identification information identifies a user corresponding to the user equipment, and the second identification information is a result obtained by performing anonymization processing on the first identification information.

Optionally, the processing unit 820 is specifically configured to: obtain the first identification information from a message sent by the core network device; obtain the second identification information from a message sent by the core network device; or obtain the first identification information from a message sent by the core network device, and perform anonymization processing on the first identification information to obtain the second identification information.

Optionally, the processing unit 820 is specifically configured to obtain the first identification information from the second uncharged traffic message, or obtain the second identification information from the second uncharged traffic message.

Optionally, the transceiver unit 810 is further configured to receive a third uncharged traffic message from the core network device, where the third uncharged traffic message is a message that is transmitted via the base station without generating to-be-charged traffic. The processing unit 820 is specifically configured to obtain the first identification information from the third uncharged traffic message, or obtain the second identification information from the third uncharged traffic message.

For example, the message that is transmitted via the base station without generating the to-be-charged traffic is a user plane message that is transmitted via the base station and a user plane data gateway without generating the to-be-charged traffic.

For example, the user plane message that is transmitted via the base station and the user plane data gateway without generating the to-be-charged traffic is a session initiation protocol SIP message.

For example, the first uncharged traffic message is a SIP query message, and the second uncharged traffic message is a SIP query response message. Alternatively, the first uncharged traffic message is a SIP registration message, and the second uncharged traffic message is a SIP registration response message.

For example, the core network device is a call session control function device.

For example, the message that is transmitted via the base station without generating the to-be-charged traffic is a control plane message transmitted via the base station but not via a user plane data gateway.

For example, the control plane message transmitted via the base station but not via the user plane data gateway is a non-access stratum NAS message.

For example, the first uncharged traffic message is a NAS registration message, and the second uncharged traffic message is a NAS registration accept message.

For example, the core network device is an access management network element.

For example, the second uncharged traffic message further includes an authentication address of the login information.

For example, the login information includes a result of encrypting or signing, by the core network device, at least one of the following information: information about the user equipment, information about the user corresponding to the user equipment, the authentication address of the login information, an application scope of the login information, or a validity period of the login information.

In a second design, the apparatus 800 may be the core network device (for example, the core network device in FIG. 3, the call session control function device in FIG. 4, the access management network element in FIG. 5, the S-CSCF device in FIG. 6A and FIG. 6B, or the AMF network element in FIG. 7A and FIG. 7B) in the foregoing embodiments, or may be a component (for example, a chip) of the core network device. The apparatus 800 may implement the steps or procedures performed by the core network device in the foregoing method embodiments. The transceiver unit 810 may be configured to perform a transceiver-related operation (for example, an operation of sending and/or receiving data or a message) of the core network device in the foregoing method embodiments. For example, the transceiver unit 810 may be configured to perform the operation of receiving the first uncharged traffic message from the user equipment in step 301, the operation of sending the second uncharged traffic message to the user equipment in step 302, and the operation of receiving the login information from the application server in step 304 in FIG. 3; may be further configured to perform the operation of receiving the SIP request message from the user equipment in step 401, the operation of sending the response to the SIP request message to the user equipment in step 402, and the operation of receiving the login information from the application server in step 404 in FIG. 4; may be further configured to perform the operation of receiving the NAS request message from the user equipment in step 501, the operation of sending the response to the NAS request message to the user equipment in step 502, and the operation of receiving the login information from the application server in step 504 in FIG. 5; may be further configured to perform an operation of sending and/or receiving data or a message by the S-CSCF device in FIG. 6A and FIG. 6B; and may be further configured to perform an operation of sending and/or receiving data or a message by the AMF network element in FIG. 7A and FIG. 7B. The processing unit 820 may be configured to perform an operation related to data and/or information processing of the core network device in the foregoing method embodiments or an operation other than receiving and sending (for example, an operation other than sending and/or receiving data or a message). For example, the processing unit 820 may be configured to perform the operations of step 611 and step 616 in FIG. 6A and FIG. 6B, and may be further configured to perform the operations of step 710 and step 715 in FIG. 7A and FIG. 7B.

In a possible implementation, the transceiver unit 810 is configured to receive a first uncharged traffic message from a user equipment, where the first uncharged traffic message is for triggering the core network device to send a second uncharged traffic message to the user equipment. The processing unit 820 is configured to generate login information, where the login information is information needed by the user equipment to log in to an application server. The transceiver unit 810 is further configured to send the second uncharged traffic message to the user equipment, where the second uncharged traffic message includes the login information. Both the first uncharged traffic message and the second uncharged traffic message are messages that are transmitted via a base station without generating to-be-charged traffic.

For example, the first uncharged traffic message indicates the core network device to provide the login information to the user equipment.

Optionally, the transceiver unit 810 is further configured to send first identification information or second identification information to the user equipment, where the first identification information identifies a user corresponding to the user equipment, and the second identification information is a result obtained by performing anonymization processing on the first identification information.

Optionally, the processing unit 820 is further configured to perform anonymization processing on the first identification information to obtain second identification information. The transceiver unit 810 is configured to send the second identification information to the user equipment.

For example, the second uncharged traffic message includes the first identification information or the second identification information.

Optionally, the transceiver unit 810 is specifically configured to send a third uncharged traffic message to the user equipment, where the third uncharged traffic message includes the first identification information or the second identification information. The third uncharged traffic message is a message that is transmitted via the base station without generating to-be-charged traffic.

For example, the message that is transmitted via the base station without generating the to-be-charged traffic is a user plane message that is transmitted via the base station and a user plane data gateway without generating the to-be-charged traffic.

For example, the user plane message that is transmitted via the base station and the user plane data gateway without generating the to-be-charged traffic is a session initiation protocol SIP message.

For example, the first uncharged traffic message is a SIP query message, and the second uncharged traffic message is a SIP query response message. Alternatively, the first uncharged traffic message is a SIP registration message, and the second uncharged traffic message is a SIP registration response message. The SIP query message may be, for example, a SIP OPTIONS message.

For example, the core network device is a call session control function device.

For example, the message that is transmitted via the base station without generating the to-be-charged traffic is a control plane message transmitted via the base station but not via a user plane data gateway.

For example, the control plane message transmitted via the base station but not via the user plane data gateway is a non-access stratum NAS message.

For example, the first uncharged traffic message is a NAS registration message, and the second uncharged traffic message is a NAS registration accept message.

For example, the core network device is an access management network element.

For example, the second uncharged traffic message further includes an authentication address of the login information.

Optionally, the transceiver unit 810 is further configured to: receive a login authentication message from the application server, where the login authentication message includes the login information; and send third identification information of the user to the application server, where the third identification information of the user is determined based on the login information.

Optionally, the transceiver unit 810 is specifically configured to: if the core network device authenticates the login information, send the third identification information of the user to the application server.

Optionally, the processing unit 820 is further configured to determine the third identification information of the user based on the login information and a correspondence, where the correspondence includes a correspondence between the third identification information of the user and the login information.

For example, the login information includes a result of encrypting or signing, by the core network device, at least one of the following information: information about the user equipment, information about the user corresponding to the user equipment, the authentication address of the login information, an application scope of the login information, or a validity period of the login information.

It may be understood that a specific process in which the units perform the foregoing corresponding steps is described in detail in the foregoing method embodiments. For brevity, details are not described herein again.

It may be further understood that the apparatus 800 herein is presented in a form of functional units. The term "unit" herein may be an application-specific integrated circuit (application-specific integrated circuit, ASIC), an electronic circuit, a processor (for example, a shared processor, a dedicated processor, or a group processor) configured to execute one or more software or firmware programs, a memory, a merged logic circuit, and/or another appropriate component that supports the described function. In an optional example, a person skilled in the art may understand that the apparatus 800 may be specifically the user equipment in the foregoing embodiments, and may be configured to perform the procedures and/or steps corresponding to the user equipment in the foregoing method embodiments, for example, steps 301 to 303 in FIG. 3, steps 401 to 403 in FIG. 4, steps 501 to 503 in FIG. 5, steps 601, 604, 605 to 610, 612, 613, and 619 in FIG. 6A and FIG. 6B, and steps 701, 703, 704 to 709, 711, 712, and 718 in FIG. 7A and FIG. 7B. Alternatively, the apparatus 800 may be specifically the call session control function device in the foregoing embodiments, and may be configured to perform the procedures and/or steps corresponding to the core network device (for example, the core network device in FIG. 3, the call session control function device in FIG. 4, the access management network element in FIG. 5, the S-CSCF device in FIG. 6A and FIG. 6B, or the AMF network element in FIG. 7A and FIG. 7B) in the foregoing method embodiments, for example, steps 301, 302, and 304 in FIG. 3, steps 401, 402, and 404 in FIG. 4, steps 501, 502, and 504 in FIG. 5, steps 601 to 604, 610 to 612, and 615 to 617 in FIG. 6A and FIG. 6B, and steps 701 to 703, 709 to 711, and 714 to 716 in FIG. 7A and FIG. 7B. To avoid repetition, details are not described herein again.

The apparatus 800 in the foregoing solutions has a function of implementing the corresponding steps performed by the user equipment in the foregoing methods. Alternatively, the apparatus 800 in the foregoing solutions has a function of implementing the corresponding steps performed by the core network device (for example, the core network device in FIG. 3, the call session control function device in FIG. 4, the access management network element in FIG. 5, the S-CSCF device in FIG. 6A and FIG. 6B, or the AMF network element in FIG. 7A and FIG. 7B) in the foregoing methods. The function may be implemented by hardware, or may be implemented by hardware executing corresponding software. The hardware or the software includes one or more modules corresponding to the foregoing functions. For example, the transceiver unit may be replaced with a transceiver (for example, a sending unit in the transceiver unit may be replaced with a transmitter, and a receiving unit in the transceiver unit may be replaced with a receiver), and another unit, for example, the processing unit, may be replaced with a processor, to separately perform sending and receiving operations and a related processing operation in the method embodiments.

In addition, the transceiver unit 810 may alternatively be a transceiver circuit (for example, may include a receiving circuit and a sending circuit), and the processing unit may be a processing circuit.

It should be noted that the apparatus in FIG. 8 may be the device in the foregoing embodiments, or may be a chip or a chip system, for example, a system on chip (system on chip, SoC). The transceiver unit may be an input/output circuit or a communication interface. The processing unit is a processor, a microprocessor, or an integrated circuit integrated on the chip. This is not limited herein.

FIG. 9 is a diagram of another communication apparatus 900 according to an embodiment of this application. The apparatus 900 includes a processor 910. The processor 910 is configured to execute a computer program or instructions stored in a memory 920, or read data stored in the memory 920, to perform the methods in the foregoing method embodiments. Optionally, there are one or more processors 910.

Optionally, as shown in FIG. 9, the apparatus 900 further includes the memory 920. The memory 920 is configured to store the computer program or the instructions and/or the data. The memory 920 and the processor 910 may be integrated, or may be disposed separately. Optionally, there are one or more memories 920.

Optionally, as shown in FIG. 9, the apparatus 900 further includes a transceiver 930, and the transceiver 930 is configured to receive and/or send a signal. For example, the processor 910 is configured to control the transceiver 930 to receive and/or send a signal.

In a solution, the apparatus 900 is configured to implement operations performed by the user equipment in the foregoing method embodiments.

In another solution, the apparatus 900 is configured to implement operations performed by the core network device (for example, the core network device in FIG. 3, the call session control function device in FIG. 4, the access management network element in FIG. 5, the S-CSCF device in FIG. 6A and FIG. 6B, or the AMF network element in FIG. 7A and FIG. 7B) in the foregoing method embodiments.

It may be understood that the processor in embodiments of this application may be a central processing unit (central processing unit, CPU), or may be another general-purpose processor, a digital signal processor (digital signal processor, DSP), an application-specific integrated circuit (application-specific integrated circuit, ASIC), a field programmable gate array (field programmable gate array, FPGA) or another programmable logic device, a discrete gate or transistor logic device, a discrete hardware component, or the like. The general-purpose processor may be a microprocessor, or the processor may be any conventional processor or the like.

It may be further understood that the memory in embodiments of this application may be a volatile memory and/or a nonvolatile memory. The nonvolatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM). For example, the RAM may be used as an external cache. By way of example and not limitation, the RAM includes a plurality of forms: a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

It should be noted that when the processor is the general-purpose processor, the DSP, the ASIC, the FPGA or another programmable logic device, the discrete gate or transistor logic device, or the discrete hardware component, the memory (a storage module) may be integrated into the processor.

It should be further noted that the memory described in this specification is intended to include, but is not limited to, these memories and any other suitable type of memory.

An embodiment of this application further provides a computer-readable storage medium. The computer-readable storage medium stores computer instructions for implementing the method performed by the user equipment or the core network device (for example, the core network device in FIG. 3, the call session control function device in FIG. 4, the access management network element in FIG. 5, the S-CSCF device in FIG. 6A and FIG. 6B, or the AMF network element in FIG. 7A and FIG. 7B) in the foregoing method embodiments.

An embodiment of this application further provides a computer program product, including instructions. When the instructions are executed by a computer, the method performed by the user equipment or the core network device (for example, the core network device in FIG. 3, the call session control function device in FIG. 4, the access management network element in FIG. 5, the S-CSCF device in FIG. 6A and FIG. 6B, or the AMF network element in FIG. 7A and FIG. 7B) in the foregoing method embodiments is implemented.

An embodiment of this application further provides a communication system, including the foregoing user equipment and core network device (for example, the core network device in FIG. 3, the call session control function device in FIG. 4, the access management network element in FIG. 5, the S-CSCF device in FIG. 6A and FIG. 6B, or the AMF network element in FIG. 7A and FIG. 7B).

For explanations and beneficial effects of related content of any one of the apparatuses provided above, refer to the corresponding method embodiments provided above. Details are not described herein again.

In the several embodiments provided in this application, it should be understood that the disclosed apparatus and method may be implemented in other manners. For example, the described apparatus embodiment is merely an example. For example, the division into the units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces, and indirect couplings or communication connections between apparatuses or units may be implemented in an electrical, mechanical, or another form.

All or some of the foregoing embodiments may be implemented by using software, hardware, firmware, or any combination thereof. When the software is used to implement the embodiments, all or some of the embodiments may be implemented in a form of a computer program product. The computer program product includes one or more computer instructions. When the computer program instructions are loaded and executed on a computer, the procedures or functions according to embodiments of this application are all or partially generated. The computer may be a general-purpose computer, a special-purpose computer, a computer network, or other programmable apparatuses. For example, the computer may be a personal computer, a server, or a network device. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible to the computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (solid-state drive, SSD)), or the like. For example, the usable medium includes but is not limited to any medium, such as a USB flash drive, a removable hard disk, a read-only memory (read-only memory, ROM), a random access memory (random access memory, RAM), a magnetic disk, or an optical disc, that can store program code.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method, comprising:

sending, by a user equipment, a first uncharged traffic message to a core network device, wherein the first uncharged traffic message is for triggering the core network device to send a second uncharged traffic message to the user equipment;

receiving, by the user equipment, the second uncharged traffic message from the core network device, wherein the second uncharged traffic message comprises login information, and the login information allows the user equipment to log in to an application server; and sending, by the user equipment, the login information to the application server to log in to the application server, wherein both the first uncharged traffic message and the second uncharged traffic message are transmitted via a base station without generating to-be-charged traffic, wherein each of the first uncharged traffic message and the second uncharged traffic message is a control plane message transmitted via the base station and not via a user plane data gateway, and wherein the first uncharged traffic message is a non-access stratum (NAS) registration message, and the second uncharged traffic message is a NAS registration accept message.

2. The method according to claim 1, wherein the first uncharged traffic message indicates the core network device to provide the login information to the user equipment.

3. The method according to claim 1, wherein the method further comprises:

obtaining and displaying, by the user equipment, first identification information, wherein the first identification information identifies a user corresponding to the user equipment; or obtaining and displaying, by the user equipment, second identification information, wherein the second identification information is a result obtained by performing anonymization processing on the first identification information.

4. The method according to claim 3, wherein:

the obtaining, by the user equipment, first identification information comprises obtaining, by the user equipment, the first identification information from a message sent by the core network device; or the obtaining, by the user equipment, second identification information comprises either of the following:

obtaining, by the user equipment, the second identification information from a message sent by the core network device; or obtaining, by the user equipment, the first identification information from a message sent by the core network device, and performing anonymization processing on the first identification information to obtain the second identification information.

5. The method according to claim 4, wherein the method further comprises:

receiving, by the user equipment, a third uncharged traffic message from the core network device, wherein the third uncharged traffic message is transmitted via the base station without generating to-be-charged traffic, and wherein:

the obtaining, by the user equipment, the first identification information from a message sent by the core network device comprises obtaining, by the user equipment, the first identification information from the third uncharged traffic message; or the obtaining, by the user equipment, the second identification information from a message sent by the core network device comprises obtaining, by the user equipment, the second identification information from the third uncharged traffic message.

6. The method according to claim 1, wherein the core network device is an access management network element.

7. A communication apparatus, comprising:

at least one processor, wherein the at least one processor is coupled to one or more memories storing programming instructions for execution by the at least one processor to perform operations comprising:

sending a first uncharged traffic message to a core network device, wherein the first uncharged traffic message is for triggering the core network device to send a second uncharged traffic message to the communication apparatus;

receiving the second uncharged traffic message from the core network device, wherein the second uncharged traffic message comprises login information, and the login information allows the communication apparatus to log in to an application server; and sending the login information to the application server to log in to the application server, wherein both the first uncharged traffic message and the second uncharged traffic message are transmitted via a base station without generating to-be-charged traffic, wherein each of the first uncharged traffic message and the second uncharged traffic message is a control plane message transmitted via the base station and not via a user plane data gateway, and wherein the first uncharged traffic message is a non-access stratum (NAS) registration message, and the second uncharged traffic message is a NAS registration accept message.

8. The communication apparatus according to claim 7, wherein the operations comprise:

obtaining and displaying first identification information, wherein the first identification information identifies a user corresponding to the communication apparatus; or obtaining and displaying second identification information, wherein the second identification information is a result obtained by performing anonymization processing on the first identification information.

9. The communication apparatus according to claim 8, wherein:

the obtaining first identification information comprises obtaining the first identification information from a message sent by the core network device; or the obtaining second identification information comprises either of the following:

obtaining the second identification information from a message sent by the core network device; or obtaining the first identification information from a message sent by the core network device, and performing anonymization processing on the first identification information to obtain the second identification information.

10. The communication apparatus according to claim 9, wherein the operations further comprise:

receiving a third uncharged traffic message from the core network device, wherein the third uncharged traffic message is transmitted via the base station without generating to-be-charged traffic, and wherein:

the obtaining the first identification information from a message sent by the core network device comprises obtaining the first identification information from the third uncharged traffic message; or the obtaining the second identification information from a message sent by the core network device comprises obtaining the second identification information from the third uncharged traffic message.

11. The communication apparatus according to claim 7, wherein the first uncharged traffic message indicates the core network device to provide the login information to a user equipment.

12. The communication apparatus according to claim 7, wherein the core network device is an access management network element.

* * * * *